(12) United States Patent
Baur et al.

(10) Patent No.: US 10,944,178 B1
(45) Date of Patent: Mar. 9, 2021

(54) PHYSICALLY RECONFIGURABLE STRUCTURALLY EMBEDDED VASCULAR ANTENNA

(71) Applicant: Government of the United States, as represented by the Secretary of the Air Force, Wright-Patterson AFB, OH (US)

(72) Inventors: Jeffery W Baur, Liberty Township, OH (US); Gregory H Huff, College Station, TX (US); Darren J Hartl, College Station, TX (US); Geoffrey J Frank, Dayton, OH (US); Hong Pan, Norman, OK (US)

( * ) Notice: Subject to any disclaimer, the term of this patent is extended or adjusted under 35 U.S.C. 154(b) by 389 days.

(21) Appl. No.: 15/922,195

(22) Filed: Mar. 15, 2018

Related U.S. Application Data

(60) Provisional application No. 62/472,626, filed on Mar. 17, 2017, provisional application No. 62/472,631, filed on Mar. 17, 2017.

(51) Int. Cl.

| | |
|---|---|
| *H01Q 15/00* | (2006.01) |
| *H01Q 9/16* | (2006.01) |
| *H01Q 5/30* | (2015.01) |
| *C08K 5/5317* | (2006.01) |
| *H01Q 1/36* | (2006.01) |

(52) U.S. Cl.
CPC ........... *H01Q 15/002* (2013.01); *H01Q 1/364* (2013.01); *H01Q 5/30* (2015.01); *H01Q 9/16* (2013.01); *H01Q 15/0026* (2013.01); *C08K 5/5317* (2013.01)

(58) Field of Classification Search
CPC .. H01Q 9/16; H01Q 3/20; H01Q 5/15; H01Q 5/30; H01Q 15/002; H01Q 15/0026; H01Q 1/364
See application file for complete search history.

(56) References Cited

U.S. PATENT DOCUMENTS

| | | | | |
|---|---|---|---|---|
| 6,967,628 | B2 * | 11/2005 | Rawnick | ................ H01Q 1/364 343/789 |
| 6,992,628 | B2 * | 1/2006 | Rawnick | .............. H01Q 9/0407 343/700 MS |

(Continued)

*Primary Examiner* — Dameon E Levi
*Assistant Examiner* — Jennifer F Hu
(74) *Attorney, Agent, or Firm* — AFMCLO/JAZ; Timothy Barlow

(57) ABSTRACT

A reconfigurable antenna comprises a panel having a liquid metal pump coupled to a power supply; a liquid metal reservoir in fluid communication with the pump; one or more channels for transporting the liquid metal, each of the one or more channels having a proximal end in fluid communication with the pump, each of the one or more channels having a vent at a distal end, wherein application of power to the pump moves the liquid metal into or out of the channels thereby reconfiguring the antenna. The pump may be a pneumatic pump or a magnetohydrodynamic pump, and a layer of a phosphonic acid may be included on the liquid metal-bearing surfaces of the channels. The phosphonic acid may be decylphosphonic acid (DPA), fluorobenzylphosphonic acid (FPA), or difluorobenzylphosphonic acid (DFPA), and one or more sensors may be coupled to the panel for determining the position of the liquid metal in the channels.

11 Claims, 29 Drawing Sheets

(56) References Cited

U.S. PATENT DOCUMENTS

| | | | | |
|---|---|---|---|---|
| 8,373,605 B2* | 2/2013 | Berenguer | ............... | H01Q 9/40 |
| | | | | 343/702 |
| 8,587,493 B2* | 11/2013 | Dickey | .................. | G01L 1/205 |
| | | | | 343/789 |
| 9,093,749 B2* | 7/2015 | Tsai | ......................... | H01Q 9/28 |
| 9,804,607 B1* | 10/2017 | Coleman | ................. | B23P 11/00 |
| 10,249,947 B1* | 4/2019 | Chun | ....................... | H01Q 9/30 |
| 2010/0095762 A1* | 4/2010 | Despesse | ............... | H01Q 1/243 |
| | | | | 73/290 V |
| 2010/0319572 A1* | 12/2010 | Abys | ...................... | C23F 11/10 |
| | | | | 106/14.42 |
| 2012/0075069 A1* | 3/2012 | Dickey | .................. | G01L 1/205 |
| | | | | 340/10.1 |
| 2014/0078019 A1* | 3/2014 | Kim | ...................... | H01Q 3/247 |
| | | | | 343/908 |
| 2014/0168022 A1* | 6/2014 | Cetiner | ................... | H01Q 3/01 |
| | | | | 343/761 |

* cited by examiner

Schematic description of the novel combination RF/LM metal feed structure measured and simulated log-magnitude of an antenna's reflection coefficient ($S_{11}$[dB]) for $t = 0$ in measured and simulated log-magnitude of an antenna's reflection coefficient ($S_{11}$[dB]) for $t = 0.4$ in measured and simulated log-magnitude of an antenna's reflection coefficient ($S_{11}$[dB]) for $t = 0.8$ in measured and simulated log-magnitude of an antenna's reflection coefficient ($S_{11}$[dB]) for $t = 1.2$ in measured and simulated log-magnitude of an antenna's reflection coefficient ($S_{11}$ [dB]) for $t = 2.0$ in measured and simulated log-magnitude of an antenna's reflection coefficient ($S_{11}$[dB]) for $t$ = 2.4 in measured and simulated log-magnitude of an antenna's reflection coefficient ($S_{11}$ [dB]) for $t$ = 2.6 in measured and simulated radiation patterns in the yx- (left) and xz-planes (right) for $t == 0$ at $f = 4.013$ GHz measured and simulated radiation patterns in the yx- (left) and xz-planes (right) for $t = 0.4$ at $f = 2.437$ GHz measured and simulated radiation patterns in the yx- (left) and xz-planes (right) for $t = 0.8$ at $f = 1.608$ GHz measured and simulated radiation patterns in the yx- (left) and xz-planes (right) for $t = 1.2$ at $f = 1.156$ GHz measured and simulated radiation patterns in the yx- (left) and xz-planes (right) for $t == 1.6$ at $f = 0.759$ GHz measured and simulated radiation patterns in the yx- (left) and xz-planes (right) for $t = 2.0$ at $f = 0.545$ GHz measured and simulated radiation patterns in the yx- (left) and xz-planes (right) for $t = 2.4$ at $f = 0.386$ GHz measured and simulated radiation patterns in the yx- (left) and xz-planes (right) for t = 2.6 at f = 0.312 GHz

PHYSICALLY RECONFIGURABLE STRUCTURALLY EMBEDDED VASCULAR ANTENNA Pursuant to 37 C.F.R. § 1.78(a)(4), this application claims the benefit of and priority to prior filed Provisional Application Ser. Nos. 62/472,626, filed 17 Mar. 2017, and 62/472,631, filed 17 Mar. 2017, which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to radio-frequency elements including antennas embedded into structural components and, more particularly, to a physically reconfigurable structurally embedded vascular antenna.

BACKGROUND OF THE INVENTION

Broadband antennas are highly advantageous in the field of telecommunications, and some of the most common broadband radiators are bow-tie and log periodic antenna. This class of antenna have many geometric variations. Overall, they generally are designed so as to maintain radiation characteristics and impedance behavior with large frequency bandwidths. The log periodic design is based on the logarithmic growth of repeating unit cells. Overlapping frequency bands coalesce to provide broadband behavior, and these frequencies are determined by the size, growth rate, and aperture angle of the repeating cells.

In addition, structurally-embedded antennas have been studied. Conformal load-bearing antenna structure (CLAS) forms studied to date have included "smart-skin" antennas based on honeycomb sandwiching, pixelated arrays of microstrip patch antennas, Yagi-Uda arrays fabricated via direct write, high-gain log-periodic dipoles and slotted spiral antennas.

The most studied CLAS concept is the slotted waveguide antenna stiffened structure (SWASS), which has been experimentally demonstrated to be one of the most effective designs in terms of its structural and RF performance. However, such an arrangement is demanding from a manufacturing perspective because it requires high tolerance features for the slots and the structural waveguide.

A reconfigurable liquid metal antenna array within an aerospace-grade fiber-reinforced composite is unknown, particularly with the ability to controllably vary the resonant frequency of the antenna over a large frequency range and mode shape. Accordingly, what is desired is a radio frequency (RF) antenna that minimizes installation area, volume, and/or weight by both being directly embedded into the surrounding load-bearing structure and is reconfigurable, i.e., a structurally embedded vascular antenna (SEVA), such that a single fed antenna can meet numerous RF mission objectives.

SUMMARY OF THE INVENTION

The present invention overcomes the foregoing problems and other shortcomings, drawbacks, and challenges of antenna structures. While the invention will be described in connection with certain embodiments, it will be understood that the invention is not limited to these embodiments. To the contrary, this invention includes all alternatives, modifications, and equivalents as may be included within the spirit and scope of the present invention.

Currently, most antennas have separate electronics components and structural elements which protect the electronics but allow the electromagnetic energy to pass through. Many examples of structurally integrated antenna exist, including conformally printed elements, structurally embedded solid metals, and structural slot waveguides. Rather than structurally embedded fixed elements, what is desirable is a structural antenna assembly having active radiating elements that are made reconfigurable by the transport of non-toxic liquid metal which is transported within internal passages of the structural antenna to create a number of different configurations of the active radiating elements within a structural composite. The resonance frequency of each element is changed according to the configuration assumed by the liquid metal. Thus, multiple distinct antennas having distinct operating characteristics may be achieved with the same liquid metal within a structural element by transporting the liquid metal into different internal passages.

A goal of the present invention is to provide a continuously tunable broadband performance antenna having a large frequency range with stable radiation behavior. A further goal is to provide steering via pattern diversity and/or reconfiguration. The antenna topology chosen to enable both behaviors derives from a length-tunable dipole antenna meandered sinusoidally and antipodally in the lateral (resonant) direction and expanded transversely in a power-series growth envelope. The resulting structure is confined to a geometric region in plane resembling that of a bowtie antenna, but also benefits from the fundamental behavior of a dipole that is controllable using the flow of LM in the microvascular channel. The meandering is derived from the zig-zag style of wire log periodic antenna; these antennas can provide stable radiation and impedance characteristics across one or more large bandwidths. The characteristic frequency bands are associated with the aperture angle, size, and rate of growth of the repeating cells. The meandering leads to a number of resonance modes and creates a wider tuning range when compared to a simple linear dipole. It also provides a convenient platform for studying non-trivial planar configurations of LM-filled channels.

The present invention leverages several technologies to engineer a physically reconfigurable structurally embedded vascular antenna (SEVA). The SEVA merges fused deposition modeling (FDM) additive manufacturing and multilayer composite processing methods. The vascular network which forms the antenna may be a thin-wire meandering dipole that is tuned electromagnetically using a controlled flow (e.g. pressure-driven or magnetohydrodynamic) of a liquid metal alloy, e.g. EGaIn. In addition, embodiments presented herein provide more "electromagnetically quiet" options for reconfiguring radiating RF circuits that are structurally embedded, such as through the use of pneumatics and/or magnetohydrodynamics to move the liquid metal (LM). Other approaches which uses switches between RF elements cause an induction spike when connecting or disconnecting the circuit which makes them "noisy".

A particular geometry presented herein is the zig-zag wire log periodic dipole antenna, which may not have the instantaneous broadband behavior that is characteristic of the log periodic antenna. Rather, it includes liquid metal in a reconfigurable dipole configuration that is derived from the family of log periodic structures. Liquid metals are important for the disclosed embodiments due to their low- or non-toxic properties, relatively low viscosity, and high electrical conductivity compared to other fluids, though they present some challenges in terms of oxide formation. In one embodiment of the invention, a eutectic gallium-indium alloy (EGaIn) may be used as the liquid metal. EGaIn is nontoxic and remains liquid to −20° C., but EGaIn may be costly and may corrode other metals with which it comes in contact.

Creating networks of micro-channels in structural composites to create multifunctional structures has been studied for some time, but the consideration of liquid metal circuits embedded in structural materials, e.g. composites, provides greater challenges.

This is the first fabrication and demonstration of an array of active antenna elements which may be individually configured and networked to create a phase array with unprecedented range in frequency and steering within a structural composite and for a modest increase in size, weight, and power. The structural antennas disclosed herein would replace the typically expensive single-use electronic modules which are not integrated into the structure, are capable of operation in a narrow range based on a fixed antenna geometry, and which increase the size and weight of the combined systems. There may be advantages in servicing such structurally decoupled phase arrays, but for applications such as low-cost aircraft having a limited life, this is less of an issue. There is an additional advantage to the use of liquid metals in antenna systems, including to cool the electromagnetic components or the structure to achieve either greater antenna power, to maintain the temperature of the electromagnetic element, or cool/heat the structure. Complete withdrawal of the liquid metal from the electromagnetic (EM) active region of the structure may serve to remove the EM active element, or serve as a variable shutter. This feature may be quite useful for agile aircraft communication and navigation, for the protection of internal components against tunable wavelengths, and for the thermal management of embedded electrical components or structures.

According to one embodiment of the present invention a reconfigurable antenna comprises a panel having a liquid metal pump coupled to a power supply; a liquid metal reservoir in fluid communication with the pump; one or more channels for transporting the liquid metal, each of the one or more channels having a proximal end in fluid communication with the pump, each of the one or more channels having a vent at a distal end, wherein application of power to the pump moves the liquid metal into or out of the channels thereby reconfiguring the antenna.

This arrangement provides the advantages of an antenna that is reconfigurable for use in several roles and in distinct wavelengths/frequencies.

According to another embodiment of the invention, the pump may be a pneumatic pump or a magnetohydrodynamic pump.

These pumps provide the advantages of a quietly reconfigurable antenna.

According to a further embodiment of the invention, the reconfigurable antenna further comprises a layer of a phosphonic acid on the liquid metal-bearing channel surfaces, and the phosphonic acid is selected from the group consisting of decylphosphonic acid (DPA), fluorobenzylphosphonic acid (FPA), and difluorobenzylphosphonic acid (DFPA).

The phosphonic acids provide the advantages of reduced or eliminated handling problems with liquid metals, e.g. EGaIn, in channels having small dimensions.

According to another embodiment of the invention, the reconfigurable antenna further comprises one or more sensors for determining the position of the liquid metal in the channels, and the one or more sensors may include one or more flow meters and optical sensors.

These sensors provide the advantages of positive determination of the exact placement of the liquid metal in the channels, corresponding to a particular frequency/wavelength.

According to a further embodiment of the invention, the pump is reversible to control the direction of the flow of the liquid metal.

This arrangement provides the advantage of the ability to quietly inject and withdraw liquid metal into the channels to controllably alter the operating characteristics of the reconfigurable antenna.

According to another embodiment of the invention, the panel comprises one of a structural panel, a conformal load-bearing panel, and an aircraft skin panel.

The panels provide the advantage of an antenna that is fully incorporated into its supporting structure, without protrusions or aerodynamic comprises.

According to a further embodiment of the invention, the channels have internal dimensions ranging between 200-700 µm in height and 200-700 µm in width.

The channel dimensions provide the advantage of effective RF performance without comprising the strength and toughness of the panel.

According to another embodiment of the invention, the liquid metal reservoir further comprises a heat exchanger.

The heat exchanger provides the advantage of the release of excess heat which may be generated by the reconfigurable antenna in use.

According to a further embodiment of the invention, the channels have a sectional shape corresponding approximately to a circle and an ellipse.

The shape of the channels provides the advantage of minimal or no impact of the strength and toughness of the finished panel.

According to another embodiment of the invention, each channel is formed in one or more layers of a panel.

This arrangement provides the advantage of a panel that is easy to manufacture, according to known composite-manufacturing techniques, and which provides sufficient strength for the panel's role as a structural element.

According to a further embodiment of the invention, the reconfigurable antenna may further comprise a stacked antenna made from two or more different micro-channels patterns, each in a different plane within the thickness of the structural composite.

This stacked arrangement may provide the advantage of a single antenna with a combined antenna response. The progression of the liquid metal within each of the channels may be independently varied to produce a combined antenna response. For planar elements, six sinusoidal elements may be created within a complex curved composite structure using fused deposition printing of sacrificial catalyzed poly (lactic acid) (cPLA) followed by transfer to a complex-shaped female tool/form, composite lamination, composite cure, and thermal removal of the sacrificial cPLA during post-cure. Each sinusoidal element may correspond to the direction of the layers of a composite material comprising the structural antenna.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

This invention presents the design, fabrication, and analysis of a "bowtie"-type broadband antenna embedded in a square structural composite panel approximately 6 inches (≈150 mm) in length/width and having radiating elements comprised of liquid metal (LM), these being energized by a custom feed that satisfies both fluid mass and electromagnetic energy transfer goals. EGaIn liquid metal is employed as the reconfigurable electromagnetic fluid. One of the primary advantages of the SEVA concept is the ability to alter antenna transmission or receiving qualities in situ by changing the location or distribution of LM infill into the microvascular network. This permits tuning of resonant frequency and gross adaptation of directivity and gain associated with discrete resonant mode changes as well.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1A:
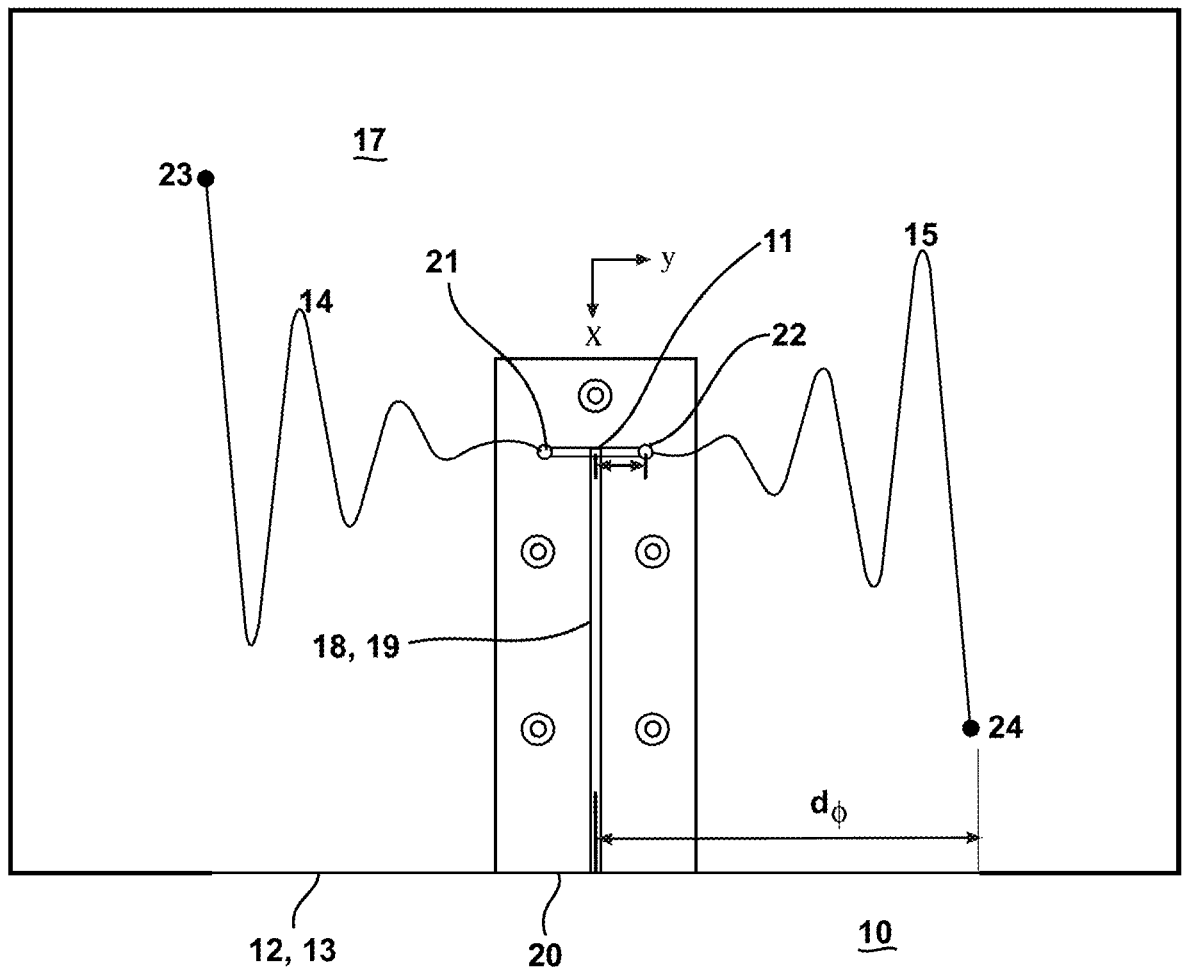
FIGS. 1A-1B illustrate plan and profile views of a SEVA-RL reconfigurable antenna with a parallel-strip feed network, according to an embodiment of the invention.
Figure 1B:
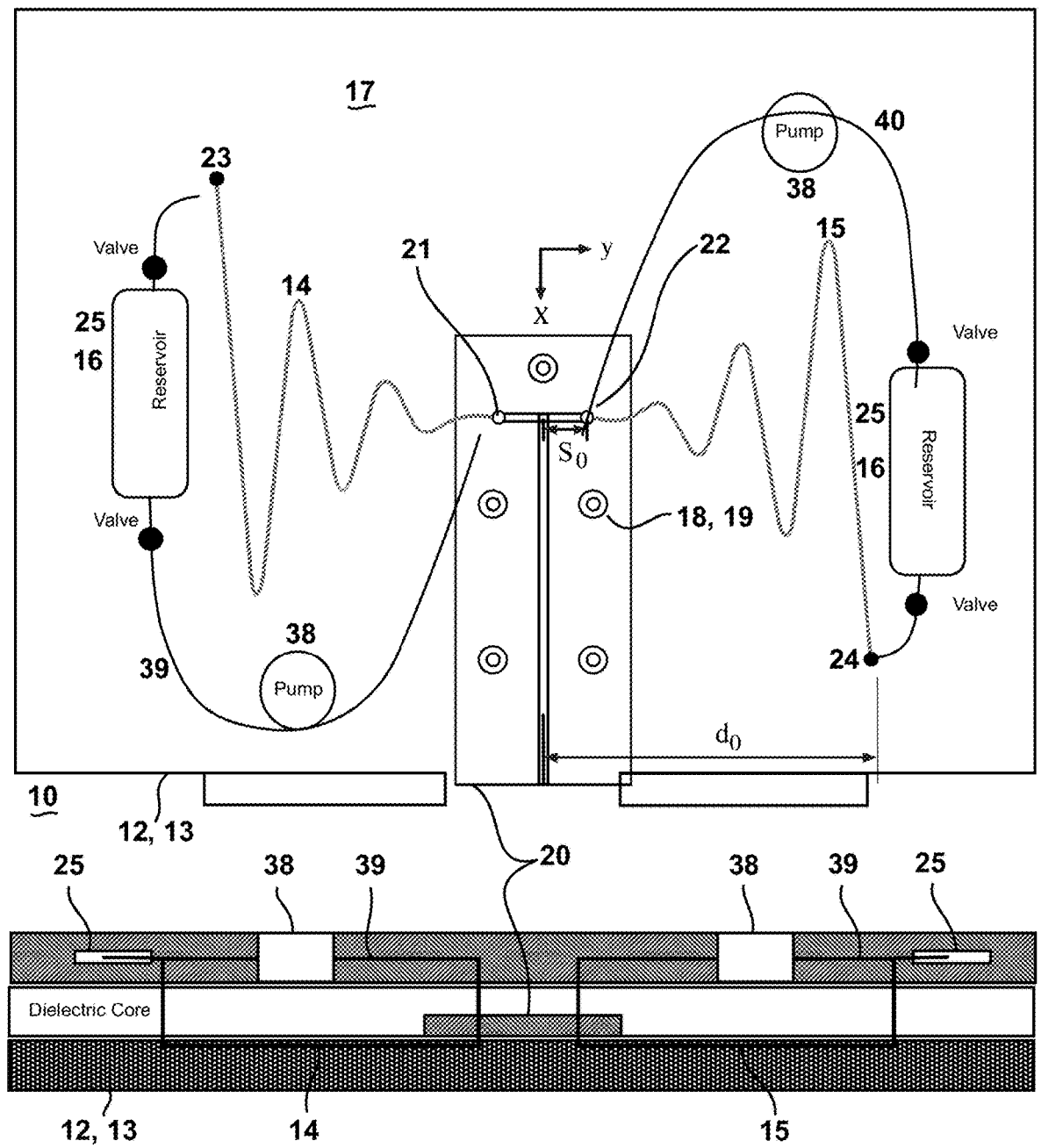

FIGS. 1A-1B illustrate a CAD model of the SEVA-RL (Structurally Embedded Vascular Antenna-Relaxed Logarithmic) 10 with its parallel-strip feed network 11. The feed network 11 was designed in concert with the SEVA 10 to provide a balun-like transition in the form of an antipodal dipole and to create physical spacing between the insertion points for liquid metal 16, as explained below. These two substrates 12, 13 (the laminate composite 21, 22 with the LM channels 14, 15, and the PCB/FR4 20 with the copper traces 18, 19 for injecting RF energy) may be aligned and fastened mechanically by drilling both substrates and tapping to match the threading of screws, e.g., nylon screws.

The two channels 14, 15 for transporting a liquid metal 16 may have a generally elliptical or circular cross-section may be embedded between the middle two plies of a woven quartz fiber-based electromagnetically compatible composite laminate 17. In the exemplary embodiment presented in FIG. 1, the planform size of the composite panel 17 containing the LM channels 14, 15 is about 152 mm×152 mm while its thickness is about 2.25 mm. The size is not critical at all; the antennas may be made any size desired. The two channels 14, 15 emanate from two closely located points corresponding to copper vias 26, 27 and, in the plane of the composite laminate panel 17, follow sinusoidal paths with increasing amplitudes, as depicted in FIG. 1A. Electromagnetically, this corresponds to a sinusoidal zig-zag wire log periodic dipole antenna with a balanced copper feed located at the center. A small piece of FR4 material 20 which may be used to create the balanced feed is about 0.813 mm while the copper traces 18, 19 that comprise the microstrip feeds (of parallel strip feed network 11) are 0.10 mm in thickness. These dimensions are provided as an example for an embodiment, but should not be understood to be deterministic. The amount of LM 16 from the LM reservoirs 25 driven (via pumps 38) into the channels 14, 15 (i.e., the length of the antenna traces) may be independently altered and/or the antenna resonance re-tuned or its directivity steered using a number of switched fluid exit ports 23, 24. Upon reaching the exit ports 23, 24, respective return circuits 39, 40 and pumps 38 may be used to return the LM 16 to the reservoirs 25 and the respective inlet ports 21, 22.

Figure 2:
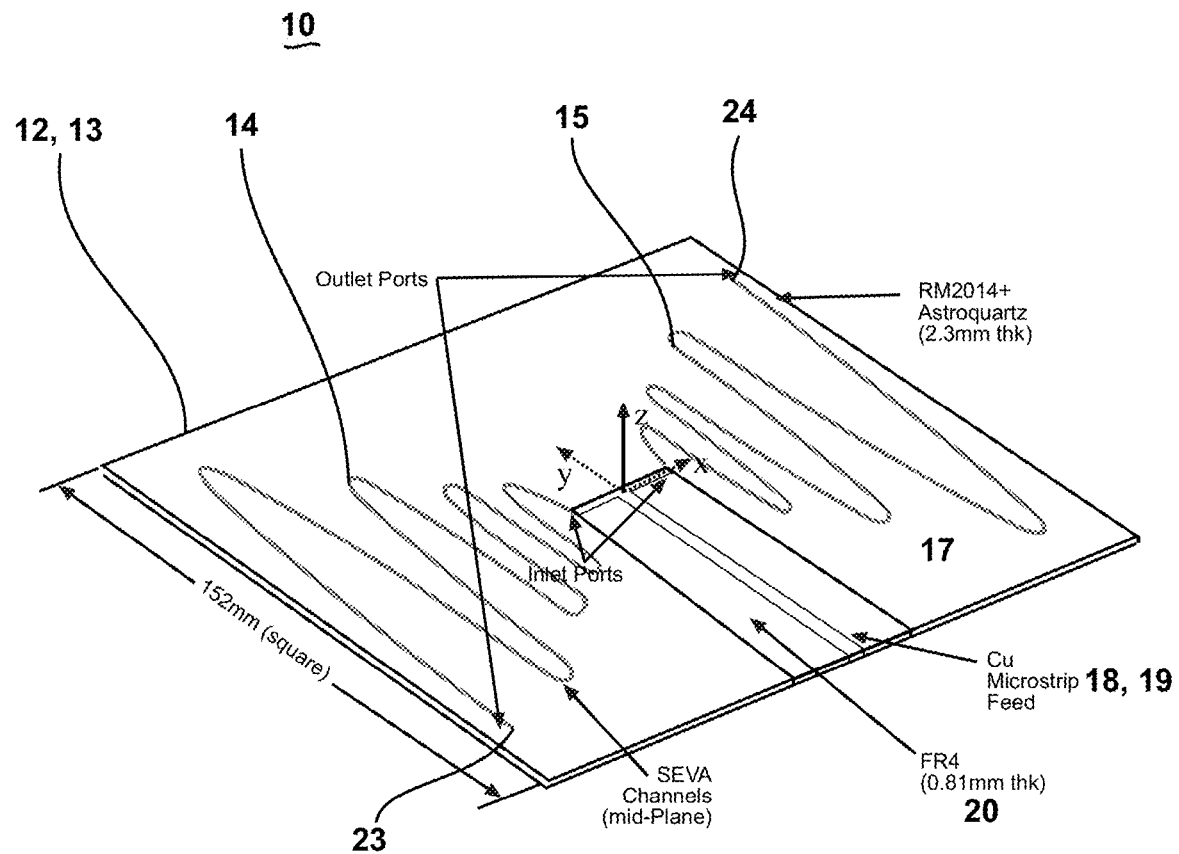
FIG. 2 illustrates a perspective view of a reconfigurable liquid metal antenna, according to an embodiment of the invention.

FIG. 2 illustrates a perspective view of a reconfigurable liquid metal antenna 10, according to an embodiment of the invention. The main body (the antenna panel) 17 of the device 10 may be a structural composite laminate comprised of eight plies (see FIG. 6) of woven quartz fiber in a low dielectric loss epoxy (e.g., Renegade RM2014). At the mid-plane (e.g., between plies 4 and 5), two independent planar channels 14, 15 which may have a complex sinusoid-based form (or other desired configuration) provide a path for the flow of liquid metal 16 from an inlet port 21, 22 toward a respective outlet port 23, 24; these channels 14, 15 represent the two arms of a dipole antenna. A novel custom antenna feed structure 11 (the feed panel) may be fabricated primarily from copper-clad FR4 and may be used to provide electromagnetic energy to the two radiating antenna arms, i.e. channels 14, 15. The principle of operation relies on the ability of the embedded channels 14, 15 to be filled to different lengths with liquid metal 16, completely changing the geometric configuration of the radiating antenna structure 10. The same principle may be used to reconfigure a wide range of antenna types. Additionally, the antenna panel itself may be fully structural and capable of taking significant aerodynamic and in-plane loads.

The Bowtie Antenna—The zig-zag wire log antenna (see FIGS. 1A-2) is simple to design and has a similar performance to other periodic antennas. This design may be operated at several frequencies; it can be easily reconfigured by altering the length of the dipole via insertion or extraction of liquid metal 16. Typically the zig-zag antenna has a triangular or trapezoidal tooth design; however, a sinusoidal tooth is presented herein. The smooth curves of channels 14, 15 aid in the retention of the structural integrity of the panel 10 and may also be advantageous for the flow of the liquid metal 16 in the channels 14, 15 with reduced resistance. In addition, this design, unlike some other log-periodic antennas, may be entirely contained within a single dimensional plane (see FIG. 4B) and multiple radiating segments are not required, making it ideal for embedding in a structural composite 17, as depicted in FIG. 2.

The topology considered in this work has been modified so as to be inscribed with that of a bowtie antenna. The primary motivation for this from an electromagnetic standpoint is a meandering dipole configuration that has space-filling geometric characteristics of both a log periodic and bowtie topologies, and to assess the impact of embedding, e.g., an antenna within a structural composite.

The specific planar configuration of a given pole in the sinusoidal dipole/bowtie antenna is given by the following two relations in x-y space (see FIG. 2) in terms of the parameters:

$$x=(0.8^s)\hat{L}$$

$$y=\tan(\theta/2)|\cos(\pi s)|^{1.2^{-s}}\text{sgn}(\cos(\pi s))(0.8^s)\hat{L};$$
$$3.25 \le s \le 11.5$$

where $\theta$ is the bowtie angle and $\hat{L}$ is a length parameter. In one embodiment of the invention, $\theta=\pi/2$ and $\hat{L}=150$ mm. Note that one pole is rotated by $\pi$ rad about the z-axis relative to the other. Given the exponential growth of the sinusoidal form, the particular antenna arrangement depicted in FIG. 1A may be referred to as the SEVA-RL (Relaxed Logarithmic), and FIG. 2 may be referred to as the SEVA-ES (Exponential Sinusoid) based on the respective channels arrangements. These two arrangements are mathematically distinct. In the SEVA-RL embodiment the sinusoidal is moved a little further out from the central feed structure (a longer initial straight channel), which provides for cleaner RF.

Liquid Metal/RF Feed Network Design

To feed the antenna design, a balanced-to-unbalanced transition (or balun) may be used. In the depicted arrangement, a parallel strip (e.g., a microstrip) line 11 acts as a balun to transmit the excitation from a coaxial cable (50Ω feed) to the center of the antenna (vias 26, 27). The feed network 11 resides in the plane of the composite panel 17 and thus minimizes unwanted interference, coupling, and blockage.

Figure 3:
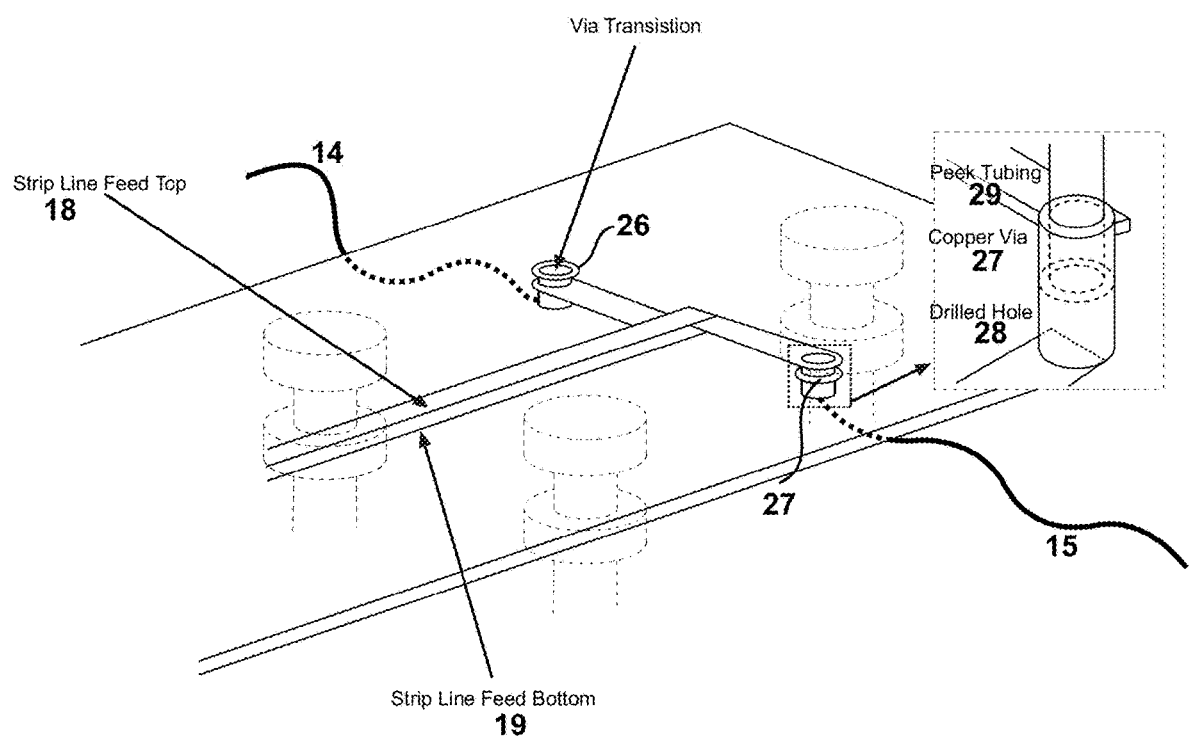
FIG. 3 illustrates a perspective view of an antipodal dipole and vertical feed structure for insertion of liquid metal alloys into a SEVA-RL, according to an embodiment of the invention.

The unique challenges involved in mating the feed panel 11 to the liquid metal antenna domain were met using special vias 26, 27 formed from copper tubing, as schematically illustrated in FIG. 3. The use of copper tubing as vias allows for fluid flow of EGaIn and also for a continuous electrical path from the copper microstrip lines 18, 19 to the EGaIn filling the micro-channels 14, 15 at the mid-plane of the antenna panel 17. The 50Ω parallel-strip feed lines of width $w_f$=2.7 mm may be fabricated on an FR4 substrate ($\varepsilon_r$=4.4, Tan δ=0.02) of height $h_f$=31 mil (0.7874 mm). The traces may extend 1 cm beyond the edge of the composite in the x-direction where they are terminated in a printed circuit board (PCB) end-launch SMA (sub-miniature version A, a common RF connector) connector (including vias for connecting the ground pins and pads); this is for connection to measurement cables. This transition may be used in place of a (tapered, etc.) microstrip-to-parallel strip transition.

FIG. 3 provides a detailed view of the feed network 11 where it terminates in an antipodal dipole with arm lengths $s_0$=10.0 mm and widths $w_d$=$w_f$. The purpose of this antipodal dipole is to act as a balun-like transition from the coplanar strips to a dipole antenna topology. It also provides physical separation between the two hollow metallic vias 26, 27 (inset shown in FIG. 3) that serve as vertical interconnects between the antipodal dipole and the SEVA-RL. These vias 26, 27 are also used to insert liquid metal 16 into the SEVA-RL 10 and thus to physically reconfigure the antenna.

Antenna Design

The SEVA-RL is designed to operate as a thin-wire dipole with rotationally symmetric arms that meander outward from the antipodal dipole. The SEVA-RL arms (channels 14, 15) meander according to the parametric equations (see equation below) for a sinusoidal oscillation with a power-series envelope according to the channel filling parameter t, so, and maximum physical length $2d_0$=6 in. (152.4 mm) such that the antenna meanders in the lateral (x) direction. The "±" provides rotational symmetry of the dipole arms, the envelope parameter α=20 controls growth of the oscillatory behavior, and the parameter $p_0$=2 controls the periodicity of the oscillation.

$$x(t) = \pm \frac{t^\alpha}{d_0^{\alpha-1}} \sin[p_0 \pi t]$$

$$y(t) = t + s_0$$

The parameterization in the equation above was chosen specifically because it provides a linearized outward transition from the antipodal dipole and the ability to control the degree of complexity introduced from meandering. This was found to be important in experimental studies leading up to this work. As a vehicle for a new antenna fabrication technique, this also represents a compromise in terms of the complexity and dimension that are possible to ensure multi-physics analysis tools capture key properties.

Reconfiguration

A driven flow of LM 16 into the channels 14, 15 allows radiating and parasitic antenna elements to be controllably created, lengthened, or shortened. For example, full evacuation of the channels 14, 15 completely removes these conductive regions from the electromagnetic domain. Physical reconfiguration of the SEVA-RL is achieved through the channel filling parameter t. Increasing t corresponds to the insertion of additional EGaIn into the channels 14, 15. This parameter extends from t=0 (the edge of the antipodal dipole) to the perimeter of the substrate at t=2.675 in simulation and to fluid extraction vias located at t=2.6 in experiment. To first order, the physical reconfiguration of the antenna from the insertion of EGaIn in the channel facilitates an increase in the electrical length of the dipole. This arrangement enables a downward shift in the 2:1 VSWR impedance bandwidth of the first radiating dipole mode. The behavior of higher order modes is not considered a priori, but it is also expected that these will be impacted by meandering.

Figure 27:
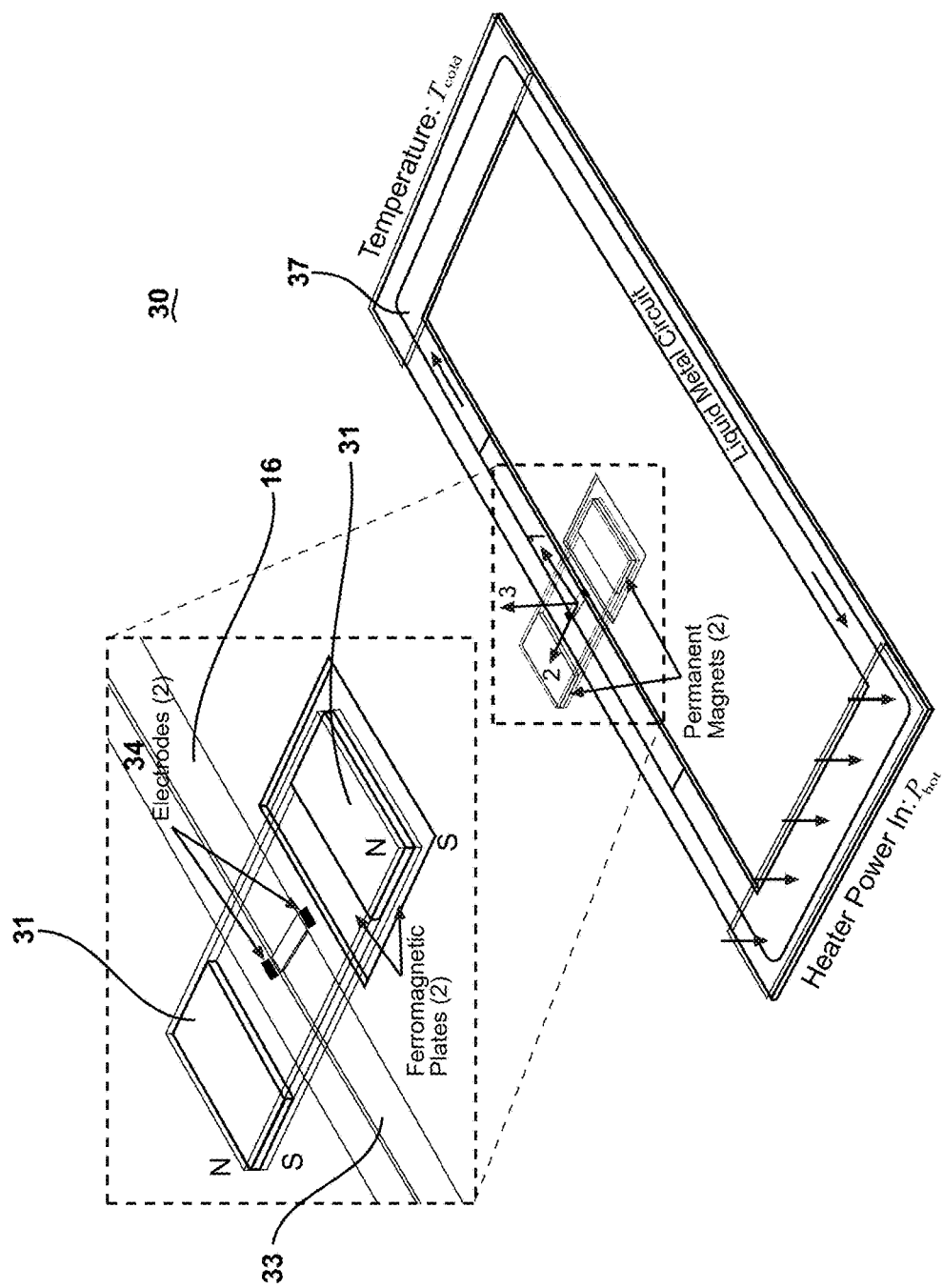
FIG. 27 illustrates details of a DC magnetohydrodynamic (MHD) pump, according to an embodiment of the invention.
Figure 28:
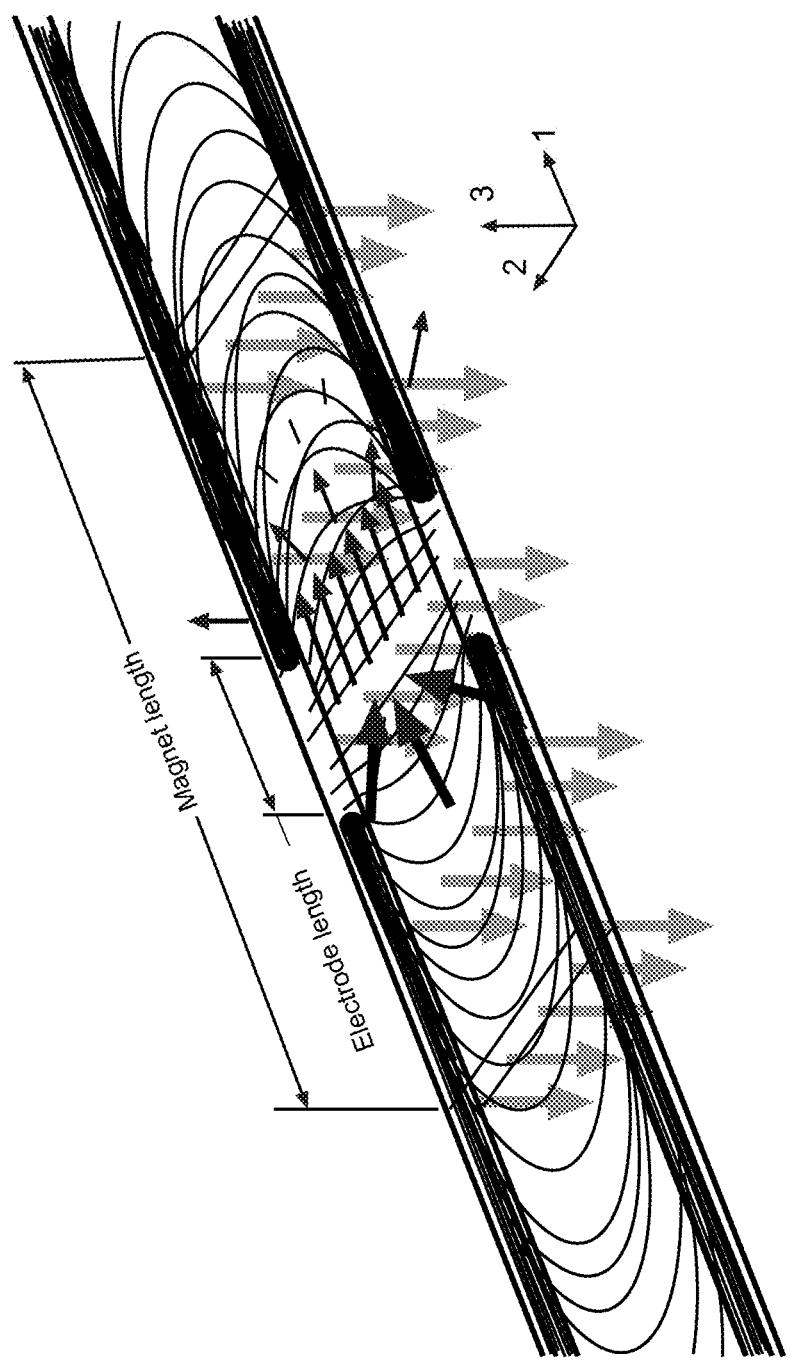
FIG. 28 illustrates a generalized DC MHD pumping effect, according to an embodiment of the invention.

EGaIn (liquid metal 16) may be moved into and out of the channels 14, 15 by several acceptable means, including one or more pneumatic pumps 38 and magnetohydrodynamic (MHD) pumps 30 (see FIGS. 27-28 for MHD pump details). These approaches provide for quietly reconfiguring the antenna through rapid movement of the liquid metal 16, e.g. EGaIn, into and out of the channels 14, 15 to achieve the desired performance characteristics of the antenna 10. A fluid circuit includes the channels 14, 15 and a reservoir 37 having a supply of a liquid metal 16. In one embodiment, a pneumatic pump 38 may be coupled with the LM reservoir 37 in order to displace LM 16 in the reservoir 25 and force the LM 16 into the channels 14, 15. The liquid pumping may be suspended when the appropriate amount of LM 16 is in the channels 14, 15. The appropriate amount of LM 16 in the channels 14, 15 may be determined by a number of arrangements, including one or more of flow meters, optical sensors, and similar means.

The reservoirs 25 may have a common length $l_{res}$ and width $w_{res}$. The longer and less wide transport channels may have a common length $l_{chan}$ and width and $w_{chan}$, respectively. Both the channels and reservoirs may have a common depth $d_{chan}$=$d_{res}$. One of the two transport channels passes through a DC-driven MHD pump 30, shown more clearly in the inset of FIG. 27. FIG. 27 depicts a loop arrangement for the channels, which is useful when the channels are used to circulate LM. However, with regard to a reconfigurable antenna 10, the channels 14, 15 may be in a linear, non-looped arrangement, as illustrated above in FIGS. 1A-2, and may even have an open, vented end (exit ports 23, 24) away from the LM reservoir 27 in order to release any air in the channels so that the LM flow in the channels 14, 15 is not restricted. The exit ports 23, 24 are not intended to discharge LM 16, but only to vent air so that the LM 16 can move freely when pumped.

The MHD pump 30 may comprise two aligned permanent magnets 31 sandwiched between two thin ferromagnetic plates 32. This arrangement creates a strong and relatively constant fixed magnetic field in the region of the liquid metal channel 33 passing between, while also providing a relatively thin and highly tailorable design. Two electrodes 34 spanning the full depth of the channel 33 allow DC current to pass through the conductive fluid 16, where the highest current density exists between the two electrode plates 34. A critical dimension is the length of the electrodes 34 in the direction of the channel, $l_{elec}$. A volumetric Lorentz force is generated by the interaction of the current and the magnetic field, driving the fluid in a direction orthogonal to both (i.e., in the direction of the channel). This effect is illustrated in FIG. 28, where realistic in-plane Lorentz force rotations induced by the non-uniform nature of the current density are shown. With regard to the MHD pump 30, design parameters such as electrode size, channel dimensions, and total driving current may be adjusted to meet desired performance characteristics.

RF Analysis

Figure 4A:
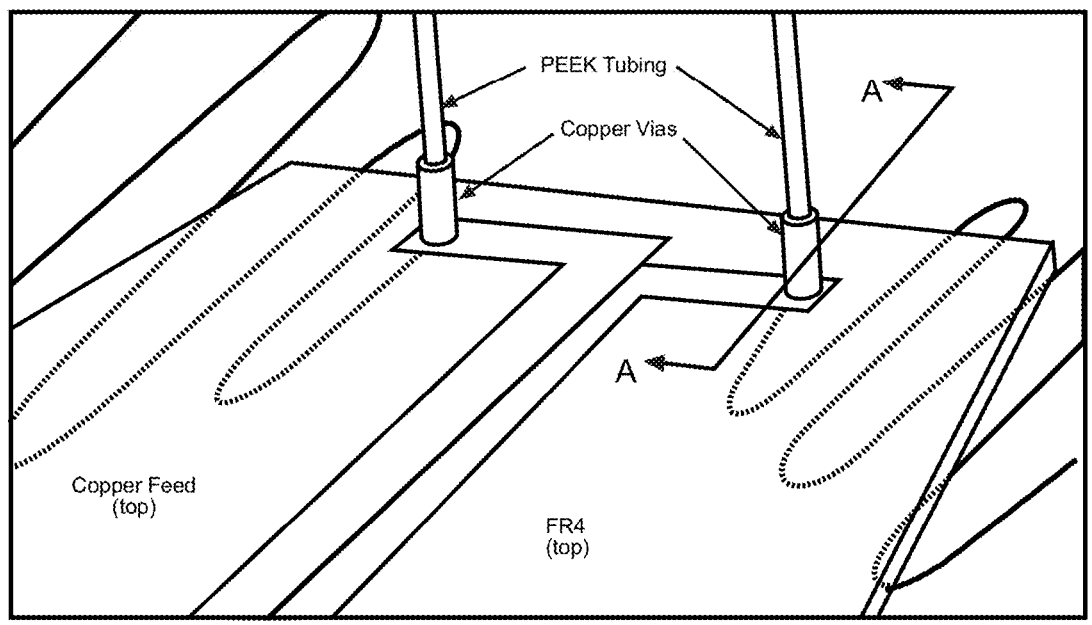
FIGS. 4A-4B illustrate a perspective view and a sectional view of the combined radio frequency (RF)/liquid metal (LM) feed structure, according to an embodiment of the invention.
Figure 4B:
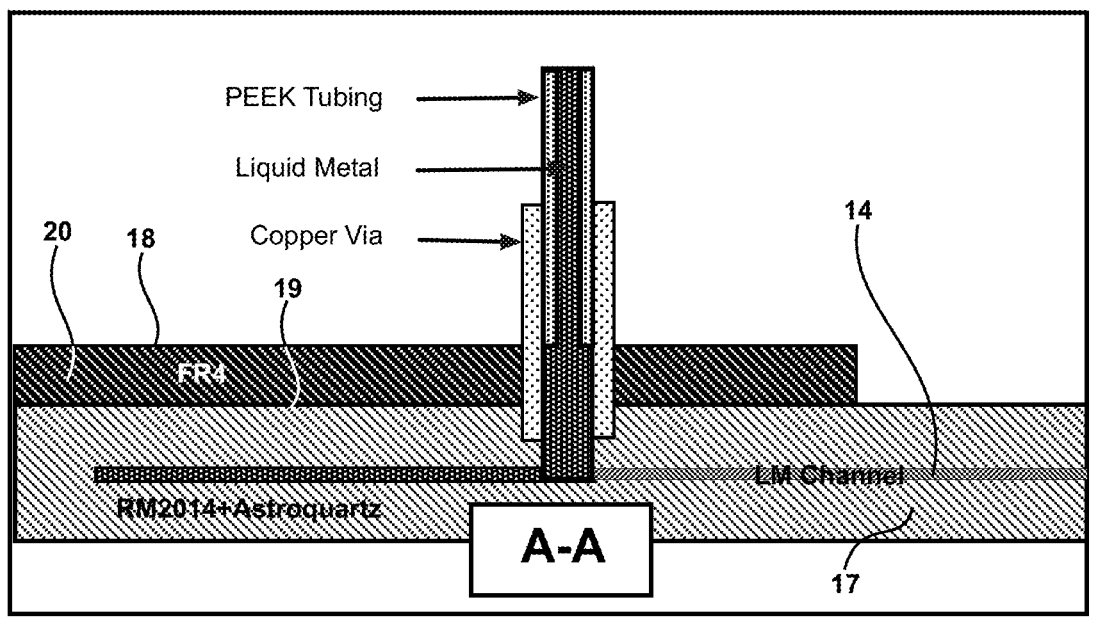

A schematic of the computational model used for RF analysis is presented in FIGS. 4A-4B, where the Astroquartz panel 17, FR4 feed material 20, copper microstrip feed 11, LM channels 14, 15, and a volume of air (in the channels 14, 15) are all considered. The material properties assumed for the quartz fiber laminate are ε=3.25 and tan(δ)=0.025, where ε and tan(δ) represent the relative permittivity (real part) and loss tangent, respectively. For the FR4, ε=4:10 and tan(δ)

=0.020. For the preliminary study shown herein, the EGaIn which comprised the LM traces (when channels 14, 15 are filled) is modeled as having the conductivity of common solder ($k=7e^6$ S/m), which is ≈2× that reported for EGaIn. All other materials are assumed to be insulating and the relative magnetic permeability is assumed to be 1.0 for all materials.

SEVA Fabrication

Material Selection

The laminate material for the research effort was RM-2014/4581 Astroquartz® III Fabric (Renegade Materials). This is a low dielectric loss epoxy/quartz prepreg cured at 150-175° C. (300-350° F.) and having an 8-harness satin weave configuration. The sacrificial polymer used to create microchannels was in the form of VascTech filament (1.75 mm), a tin (II) oxalate catalyzed polylactic acid (cPLA) purchased from CU Aerospace. The incorporation of SnOx catalyst into PLA filament permits thermal depolymerization at lower temperatures, providing the critical advantage of reducing thermal degradation of the composite resin matrix during the required post-cure (see below). The liquid metal alloy used was eutectic gallium-indium (EGaIn) (Sigma-Adrich) with a composition of 75.5% Ga and 24.5% In (by weight).

FDM Printing of Sacrificial Channel Templates

A CAD model for the single-pass (i.e., non-rastered) SEVA-ES pattern was uploaded as a STereoLithography (.stl) file to an nScrypt 3Dn-500 printer running Slic3r (version 1.2.9) and A3200 Motion Composer (Aerotech, Inc.). Sacrificial templates of the sinusoidal LM channel paths and an aligning frame using as-received VascTech filament were printed onto 0.05 mm thick Kapton™ sheet using a 0.60 mm ID ceramic extrusion nozzle maintained at 194-195° C., with a 0.6 mm layer height, a 20 mm/s print speed, an extrusion width of 0.4 mm, and a 1.5 extrusion multiplier. The build plate was maintained at 90° C. The Kapton™ sheet served as a build surface during FDM printing and as a transfer sheet during the composite panel layup stage. After printing, a hand caliper was used to measure the dimensions of the sinusoidal printed paths; heights and widths were found to be 0.45 mm each.

Figure 5:
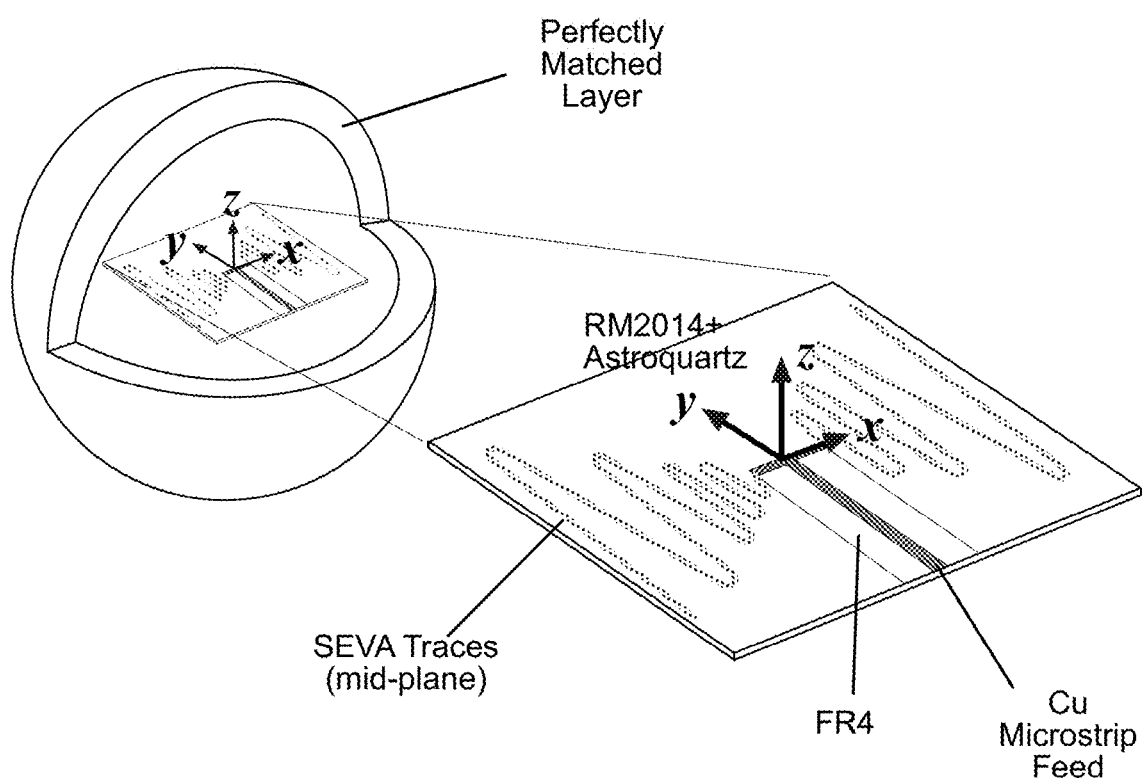
FIG. 5 illustrates the RF computational domain for SEVA traces modeled using the properties of liquid metal, according to an embodiment of the invention.

FIG. 5 is an illustration of the RF computational domain, including materials utilized. SEVA traces are modeled using the properties of liquid metal.

Microvascular Composite Laminate

Figure 6:
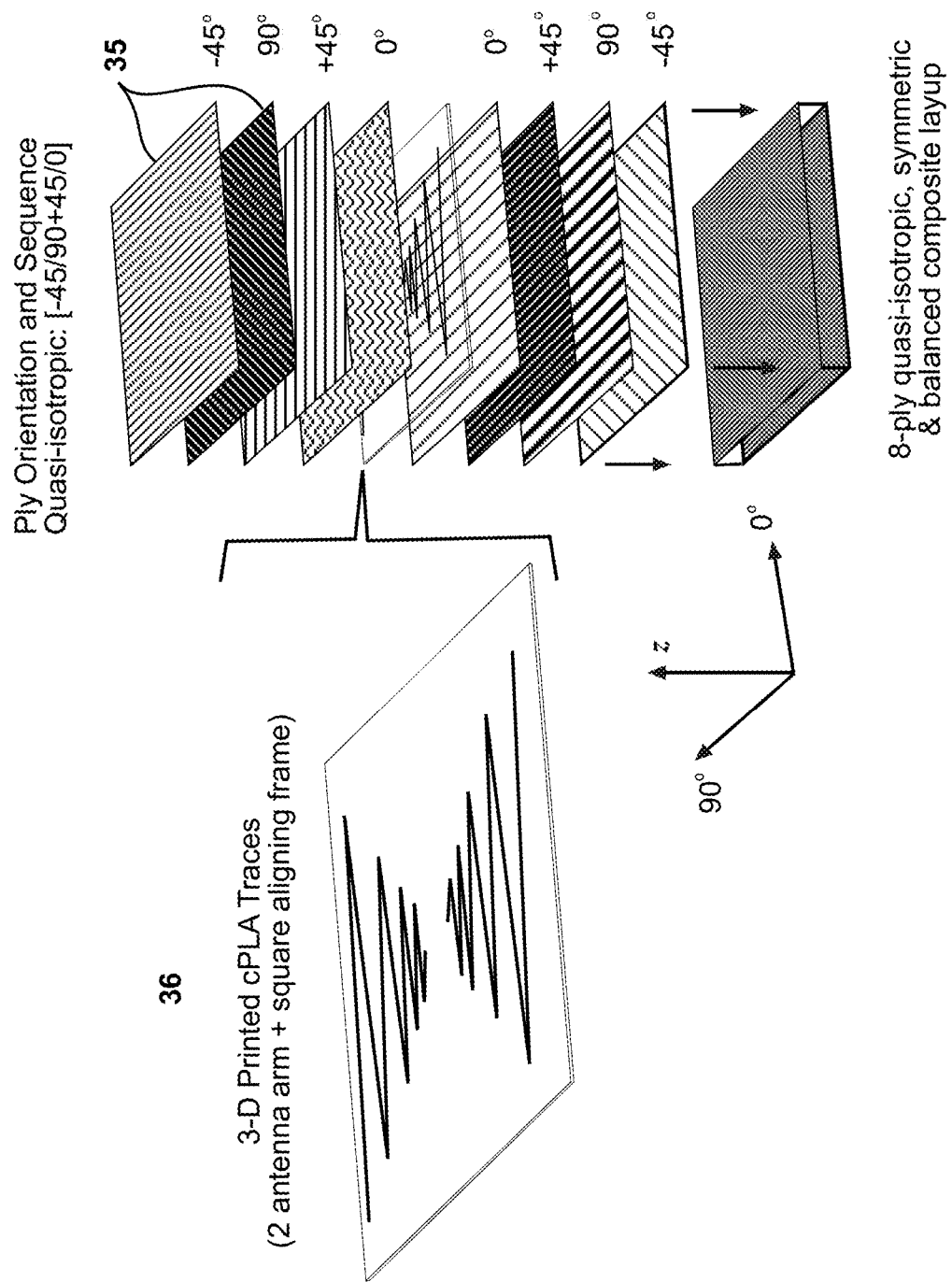
FIG. 6 depicts the layers utilized in a reconfigurable liquid metal antenna, according to an embodiment of the invention; woven composite laminate configuration. Traces of cPLA (sinusoidal paths and aligning frame) fabricated using a 3-D printer are placed at the mid-plane of an eight-ply, quasi-isotropic, symmetric, and balanced laminate.

The full ply stack (layup) consisted of eight epoxy/quartz fabric plies 35 of RM-2014/4581 Astroquartz® III fabric, each 165 mm×180 mm×2.24 mm, as shown in FIG. 6. With respect to FIG. 6, a woven composite laminate configuration includes traces 36 of cPLA (sinusoidal paths and aligning frame) which may be fabricated using a 3-D printer and may be placed at the mid-plane of an eight-ply, quasi-isotropic, symmetric, and balanced laminate, as illustrated in FIG. 6.

The eight laminae may be stacked in a quasi-isotropic $[-45/90/+45/0]_s$ sequence, as depicted in FIG. 6. After the first four plies are laid, a Kapton™ transfer sheet hosting the printed sacrificial template was inverted and the cPLA template was thermally transferred (i.e., ironed) onto ply four; a thin cotton cloth may be used as a buffer between the iron and the Kapton™. Care should be taken to avoid softening and deformation of the printed cPLA template during the thermal transfer process.

The temperature of the iron is typically 73-90° C., well below the 165° C. melting point of the cPLA sacrificial material. Other temperatures may be utilized as long as the materials/pattern are not damaged or altered. Once adhesion between the template and fourth ply is confirmed, the Kapton™ sheet is removed and the remaining four plies are sequentially laid, completing the laminate 35. An outer vacuum bag may be prepared for the laminate stack, and an autoclave cycle may be used to initially cure the composite. The ply stack was de-bulked in a vacuum of 760 mmHg for 30 min. A positive pressure of 0.55 MPa was then applied and the temperature was ramped from room temperature to 135° C. (275° F.) at 2° C./min. The vacuum was then released and this state was maintained for 4 hours, after which the autoclave was cooled at a rate of 5° C./min to 24° C. (75° F.).

Figure 7:
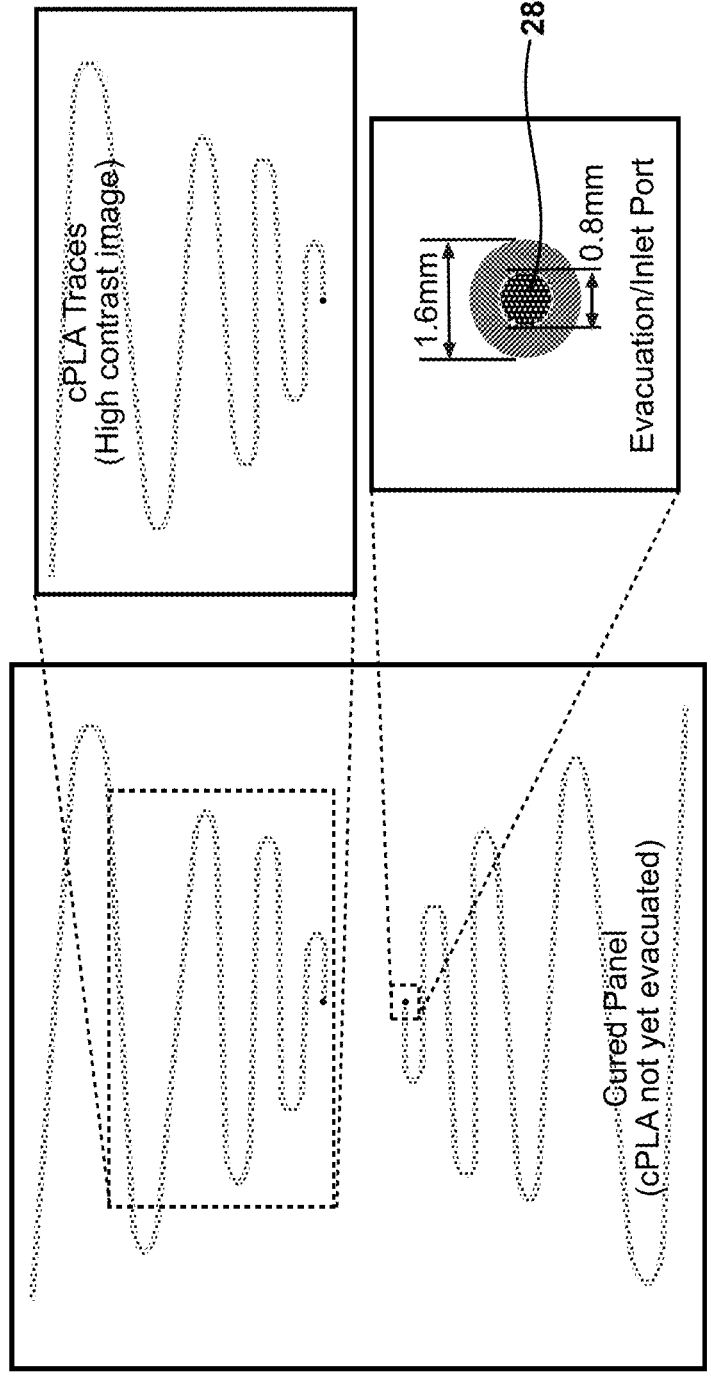
FIGS. 7A-7C illustrate a fabricated antenna panel after laminate cure and drilling of the LM inlet/outlet ports, which also provide a means of evacuating the cPLA during subsequent post-cure, according to an embodiment of the invention.

After cure, the panels may be trimmed with a wet diamond saw to a final dimension, e.g. 152 mm (6 inches) squared. A panel after completion of the laminate cure cycle is shown in FIG. 7A. Note the embedded cPLA material, visible through the translucent RM-2014/4581 Astroquartz® of FIG. 7B, and the evacuation/inlet port features of FIG. 7C.

Liquid Metal/RF Feed and cPLA Evacuation Ports

Figure 8:
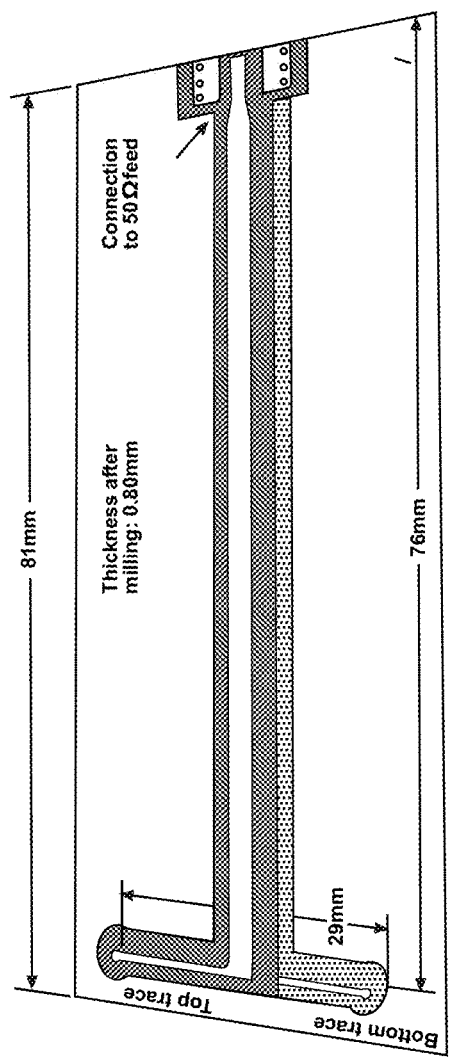
FIG. 8. illustrates a fabricated feed panel after milling of copper traces and prior to drilling of the LM inlet/outlet ports, according to an embodiment of the invention.

The feed panel (FIG. 8) may be fabricated from an initially copper clad FR-4 panel with a thickness of 0.88 mm. Cladding may be selectively removed via an automated milling process to produce microstrip lines, 3.2 mm wide by 76 mm long. The microstrip lines are used to connect the LM antenna arms to a standard 50Ω feed. Before evacuation of cPLA to produce the antenna panel micro-channels, 0.9 mm diameter holes (see FIG. 7C) were drilled into the antenna panel to the depth of the microchannels (1.37 mm deep) and were additionally counterbored to 1.6 mm diameter (0.51 mm deep) to allow insertion of the 1.6 mm diameter copper vias (see FIG. 3). An example of the final fabricated feed (prior to inlet/outlet port machining) can be seen in FIG. 7C.

The drilled ports 28 (absent any installed tubing) may allow for evacuation of cPLA during post-cure. Complementary 1.6 mm holes were drilled into the feed panel 11; these allow for electrical connection between the EGaIn and the microstrip feed 11 by way of the copper vias 18, 19. Installation of PEEK tubing 29 mating to the copper vias 18, 19 allows ingress/egress of fluids, e.g. liquid metal 16, during antenna operation; EGaIn may be pumped into the system from an external reservoir 27. Note that the outlet ports 23, 24 are generally not used for the transfer of EGaIn, but rather provide venting during ingress/egress of fluid through the centralized feed structure.

Evacuation of Sacrificial Material and LM Channel Creation

To create microchannels, a modified vaporization of sacrificial components (VASC) technique was used. After machining the evacuation/feed ports 28 and removal of associated debris, the cPLA polymer may be evacuated from the cured SEVA-ES panels via gravity-assisted sublimation. The oven temperature was first increased to 200° C. over the course of at least 45 min at ambient pressure before the panel was introduced. To take advantage of the forces of gravity in evacuating the channels, the panel may be inverted (ports down) and placed on supports above an aluminum plate. The plate, supports, and panel are placed into the oven; a thermocouple is installed on the plate to monitor the temperature locally during channel evacuation. Once the oven temperature re-equilibrated at 200° C. and a vacuum of 46 mmHg was reached, this state was maintained for 6 hours to achieve full evacuation of the cPLA. After completion of this step, the oven set temperature is reduced to room temperature and the panel is allowed to furnace cool to room temperature while still under vacuum. Once ambient temperature is reached, the panel is removed and the newly-formed micro-channels tested for patency.

To test for patency, microvascular channels were first filled and flushed with ethyl alcohol, after which the alcohol was removed using pressurized air. The patency test was qualitative and visual in nature. Evacuated (empty) channels are observed to be darker than the host composite; positive patency is associated with both the ability to flow alcohol from inlet to outlet, and also the observed uniform change in channel appearance from dark to light as it is filled with alcohol. The flow of pressurized air removes the alcohol and returns the channel to its unfilled state and dark appearance.

Experimental Rf Characterization and Comparison with Analysis

To assess in a preliminary manner the feasible operation of the SEVA-ES and in particular its ability to reconfigure based on the flow of EGaIn, a vector network analyzer was used to assess the input reflection coefficient of the fabricated SEVA-ES in two states: unfilled and partially filled. Given the design of the feed panel, an unfilled antenna corresponds to a simple dipole configuration (e.g. FIGS. 1A-1B), while partially filled describes a state in which a single full period of both sinusoidal patterns (poles) are filled with EGaIn. A scan from 1.5 to 4.5 GHz was performed, and the reflection at the 50Ω port was compared to that calculated according to the method disclosed above under "RF Analysis". The comparisons are presented in FIGS. 9A-9B.

Figure 9A:
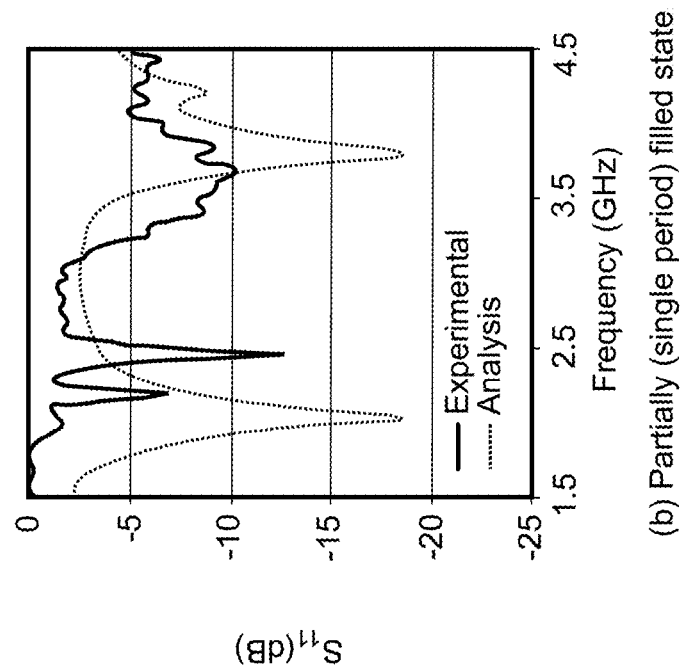
FIGS. 9A-9B depict comparisons of the input reflection coefficient $S_{11}$ (in dB) for SEVA-ES antenna in unfilled (reference) and example partially-filled state, according to an embodiment of the invention.
Figure 9B:
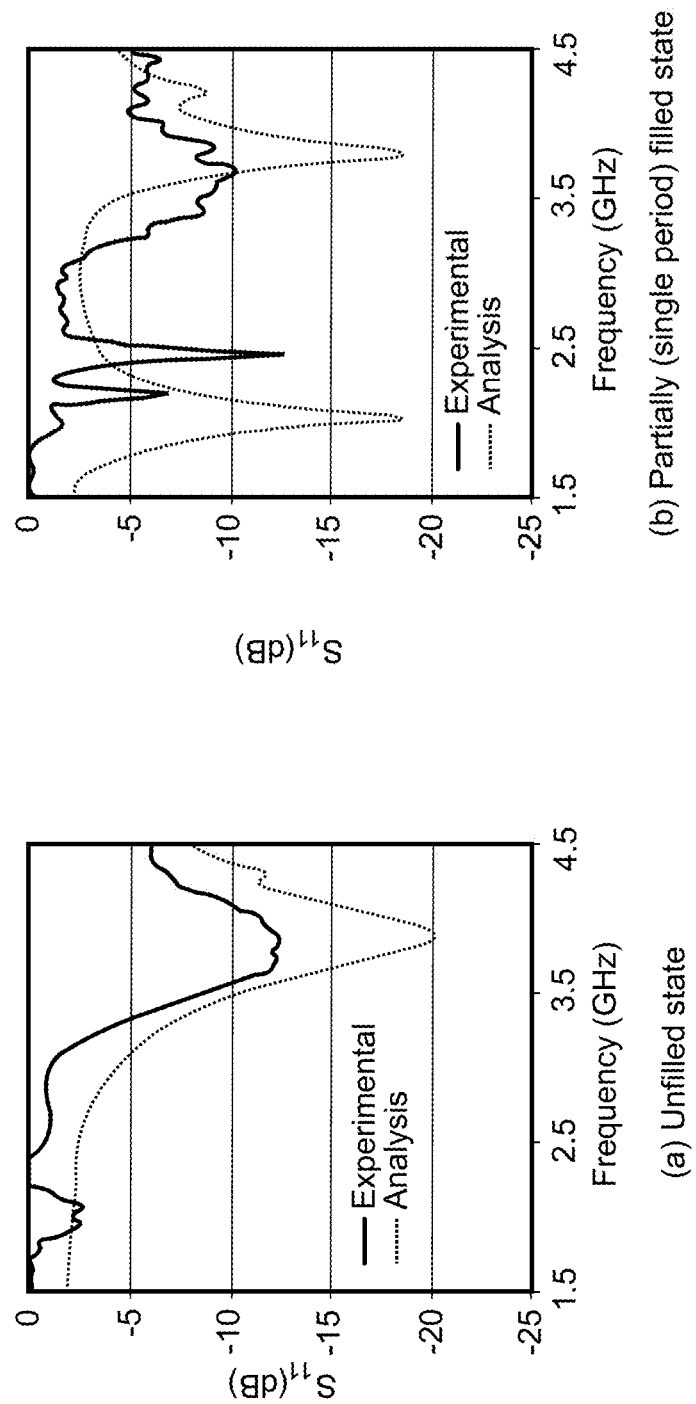
Figure 10:
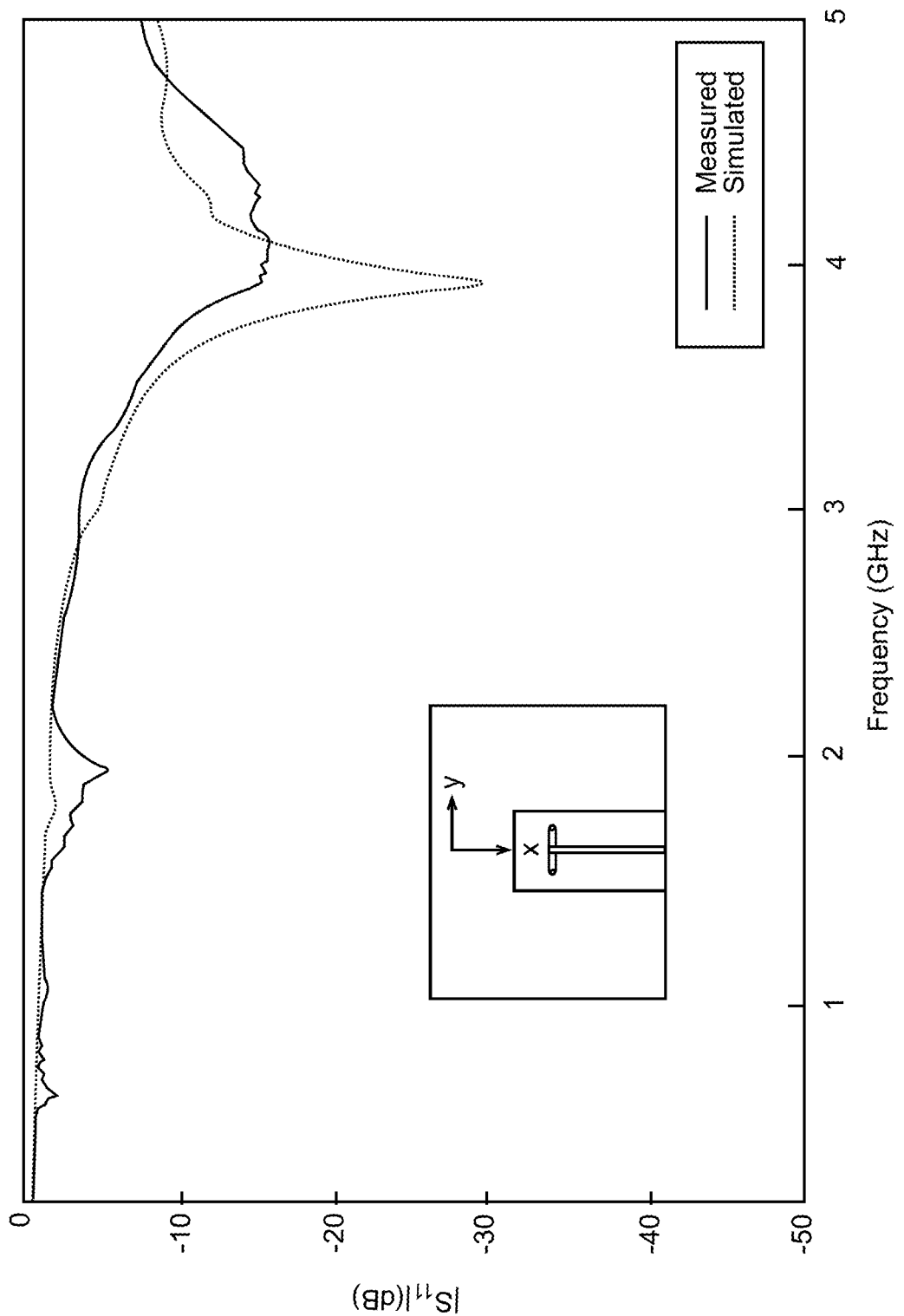
FIG. 10 illustrates measured and simulated log-magnitude of an antenna's reflection coefficient ($S_{11}$ [dB]) for t=0 in., according to an embodiment of the invention.
Figure 11:
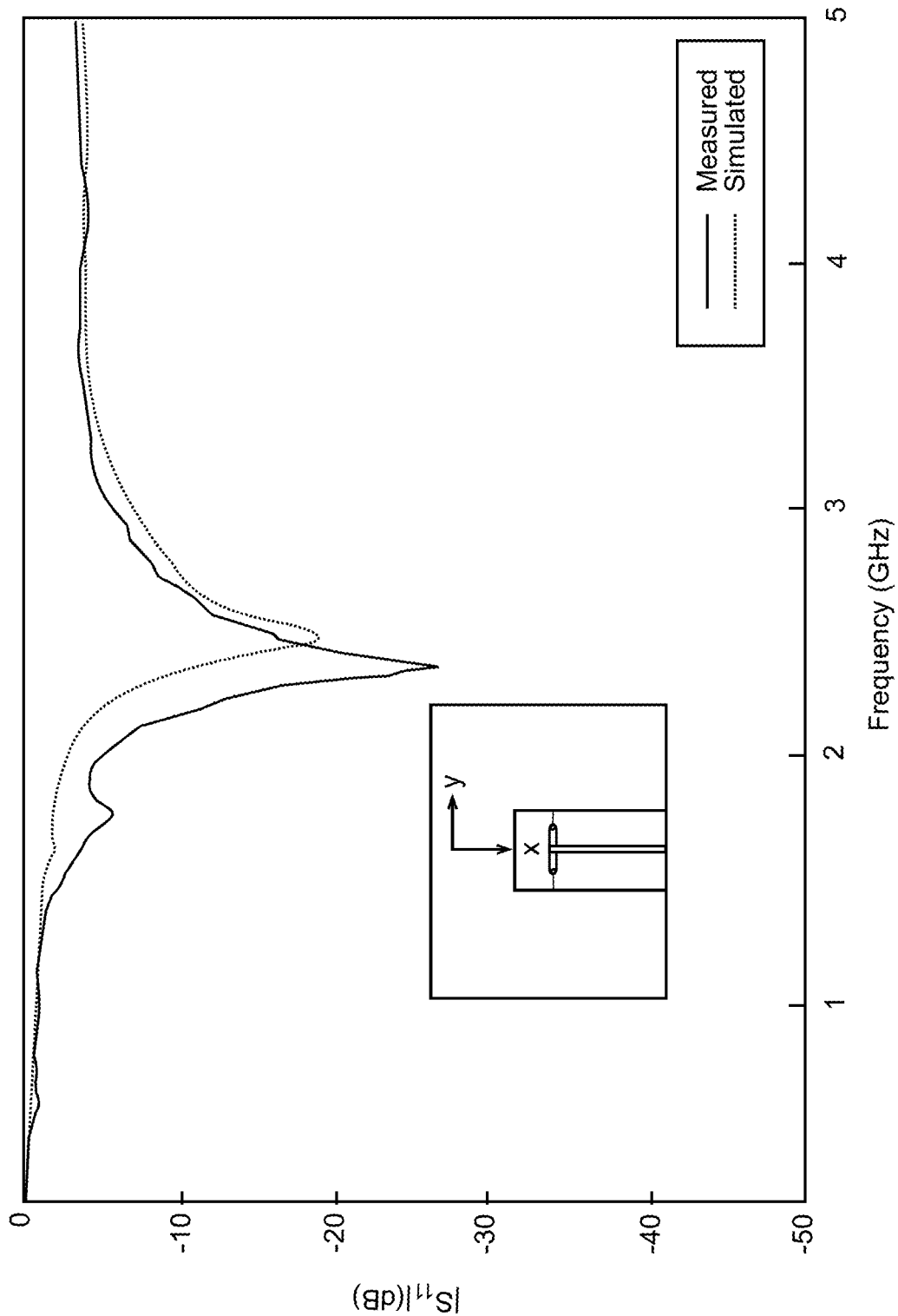
FIG. 11 illustrates measured and simulated log-magnitude of an antenna's reflection coefficient ($S_{11}$ [dB]) for t=0.4 in., according to an embodiment of the invention.
Figure 12:
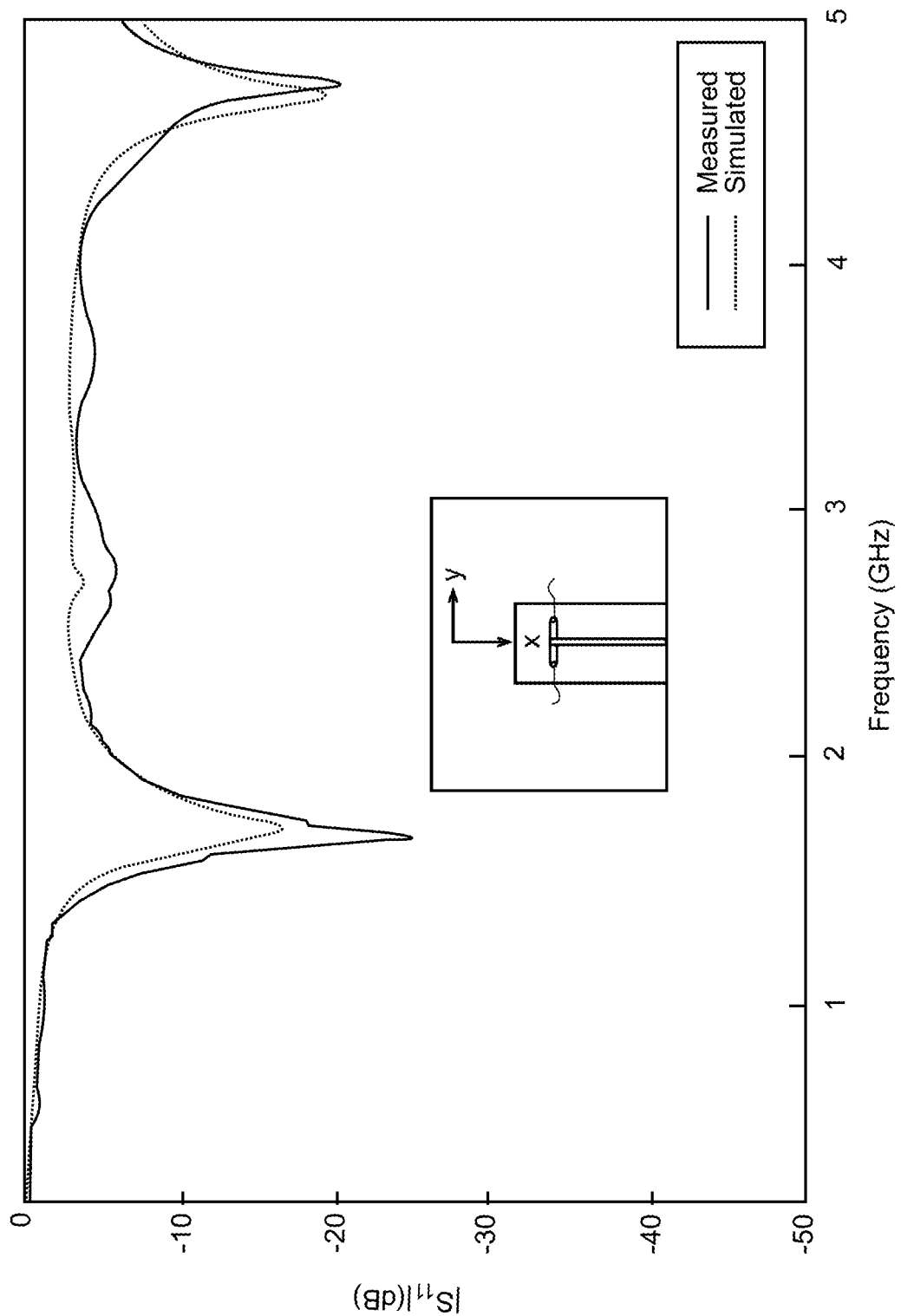
FIG. 12 illustrates measured and simulated log-magnitude of an antenna's reflection coefficient ($S_{11}$ [dB]) for t=0.8 in., according to an embodiment of the invention.
Figure 13:
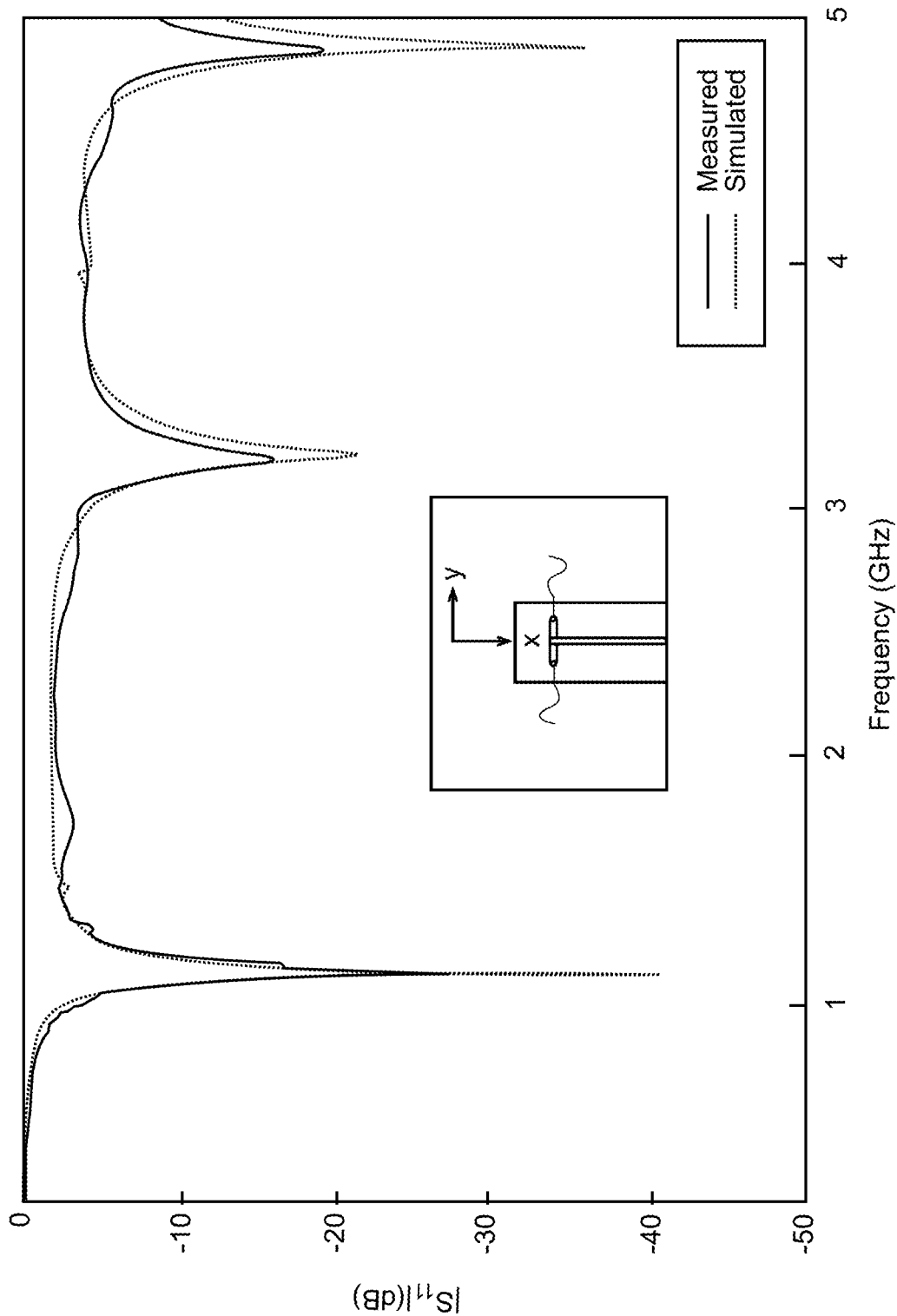
FIG. 13 illustrates measured and simulated log-magnitude of an antenna's reflection coefficient ($S_{11}$ [dB]) for t=1.2 in., according to an embodiment of the invention.
Figure 14:
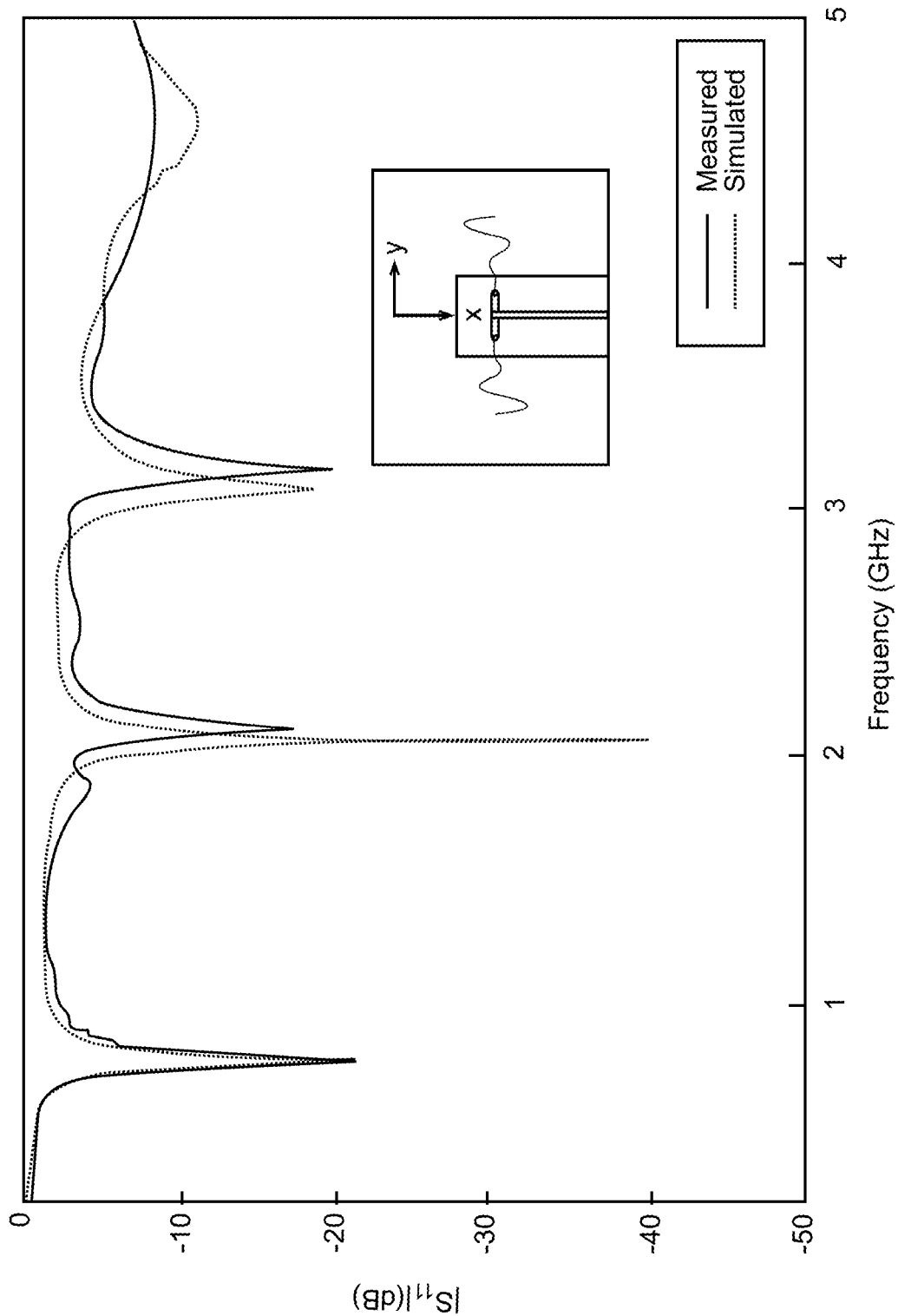
FIG. 14 illustrates measured and simulated log-magnitude of an antenna's reflection coefficient ($S_{11}$ [dB]) for t=1.6 in., according to an embodiment of the invention.
Figure 15:
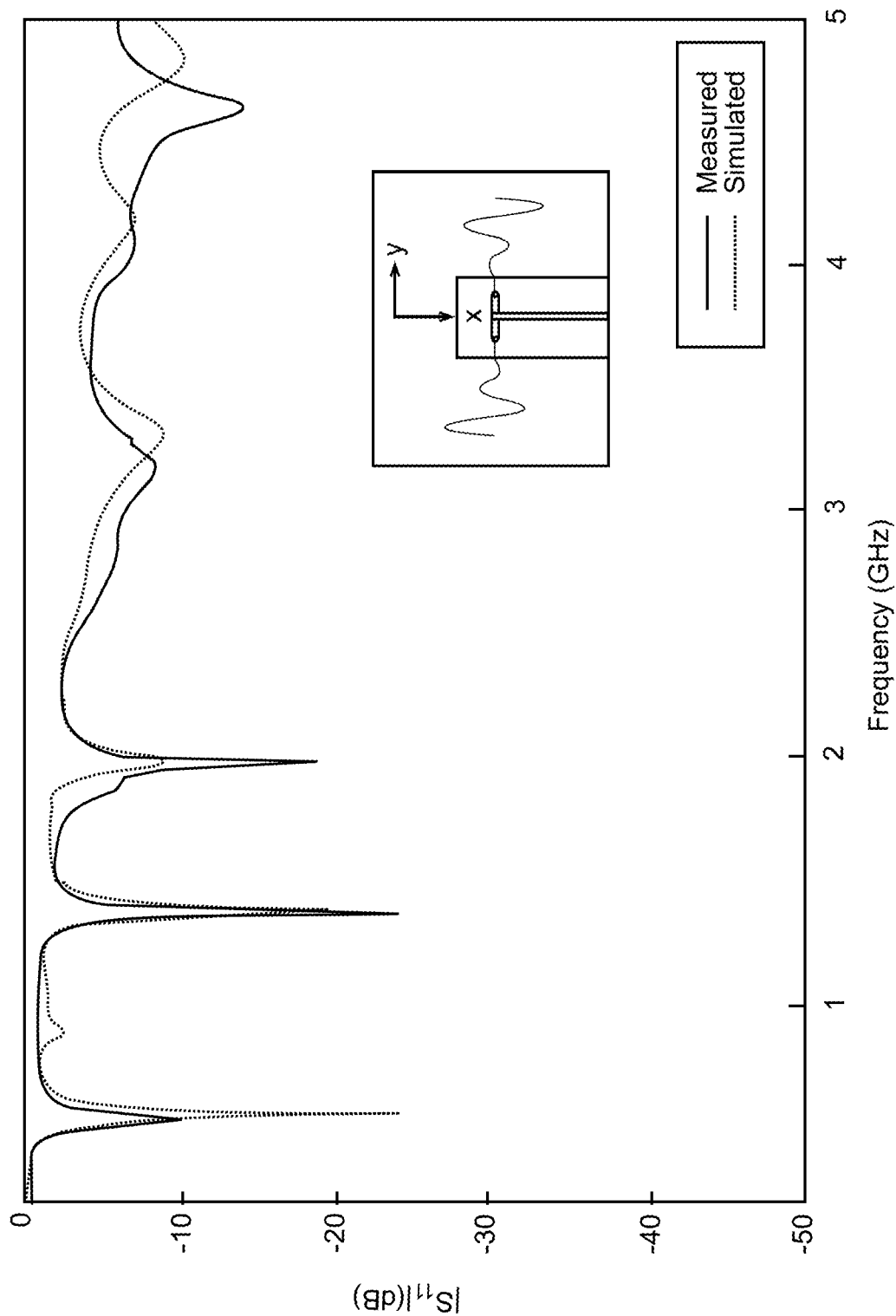
FIG. 15 illustrates measured and simulated log-magnitude of an antenna's reflection coefficient ($S_{11}$ [dB]) for t=2.0 in., according to an embodiment of the invention.
Figure 16:
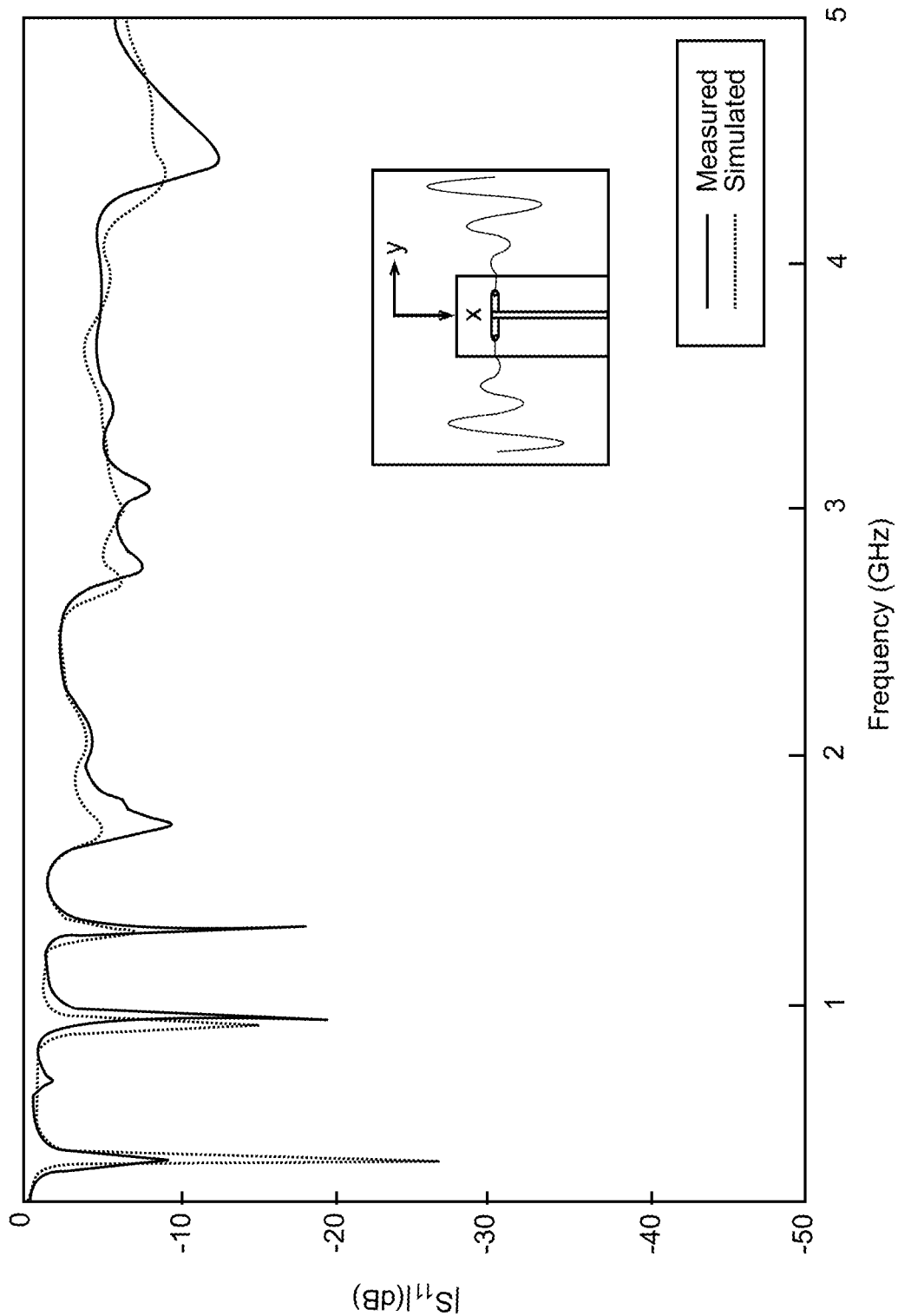
FIG. 16 illustrates measured and simulated log-magnitude of an antenna's reflection coefficient ($S_{11}$ [dB]) for t=2.4 in., according to an embodiment of the invention.
Figure 17:
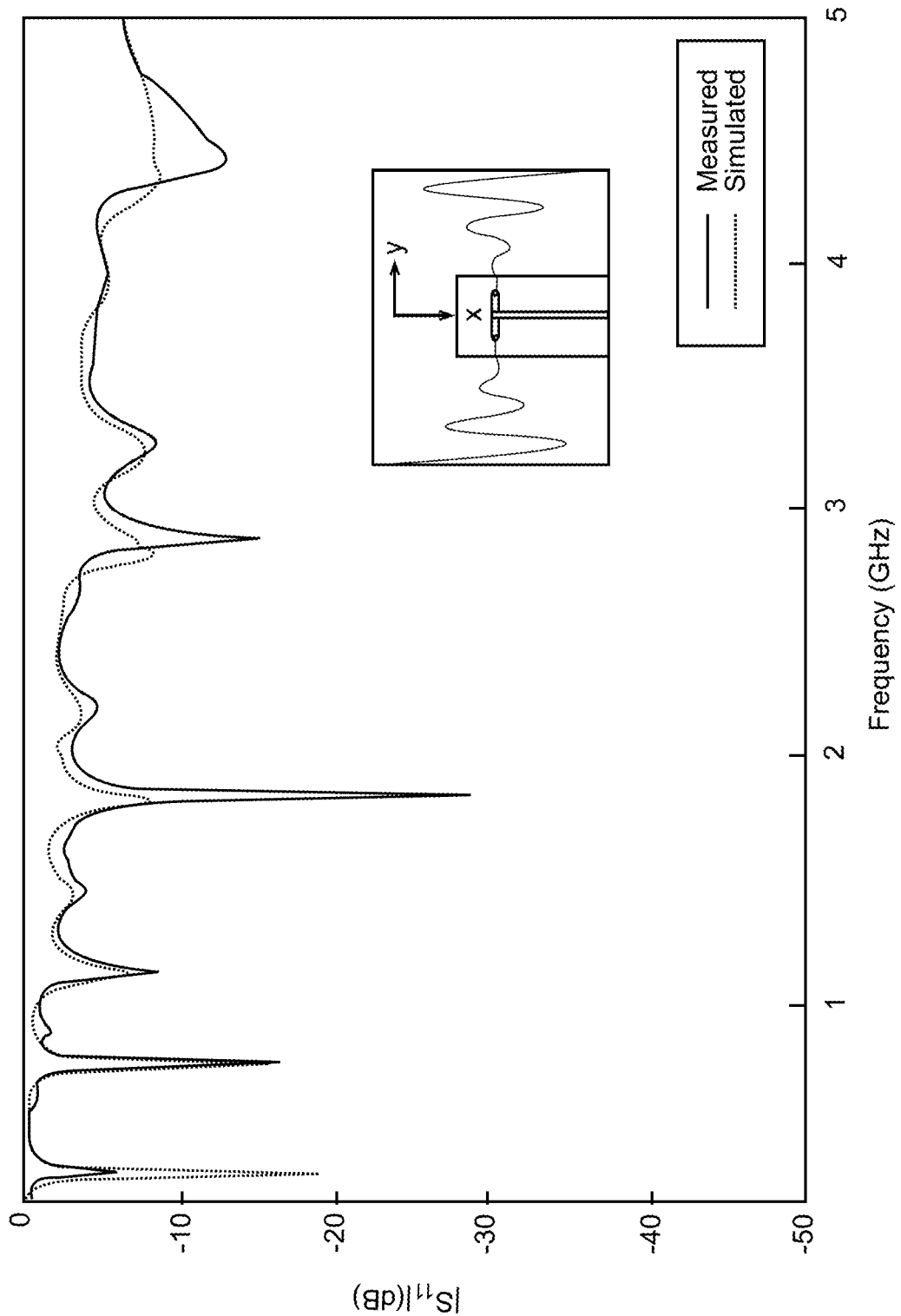
FIG. 17 illustrates measured and simulated log-magnitude of an antenna's reflection coefficient ($S_{11}$ [dB]) for t=2.6 in., according to an embodiment of the invention.

In FIG. 9A, we see that the resonance of the reference (unfilled) antenna at ≈4 GHz is generally well predicted. Upon filling the first period of the sinusoidal dipole with LM (see FIG. 9B) and thus increasing the length of the radiating elements, a second resonance at lower frequency of ≈2-2.5 GHz appears. Though the bandwidth of this retuned resonance is over-predicted by the idealized computational model, the ability of the novel fluid-electrical feed structure (see above) to provide excitation to the LM-based antenna and the effects of altering antenna configuration in situ are each demonstrated.

FIGS. 10-17 depict the measured and simulated log-magnitude of an antenna's reflection coefficient ($S_{11}$ [dB]) for eight states (i.e., t=0, 0.4, 0.8, 1.2, 1.6, 2.0, 2.4, and 2.6 inches). The input reflection coefficient (in place of VSWR) is provided for comparison between measurement and simulation (with equivalent de-embedding). Observations of these figures shows both simulated and measured results follow the same general trends.

Repeatability

Figure 18:
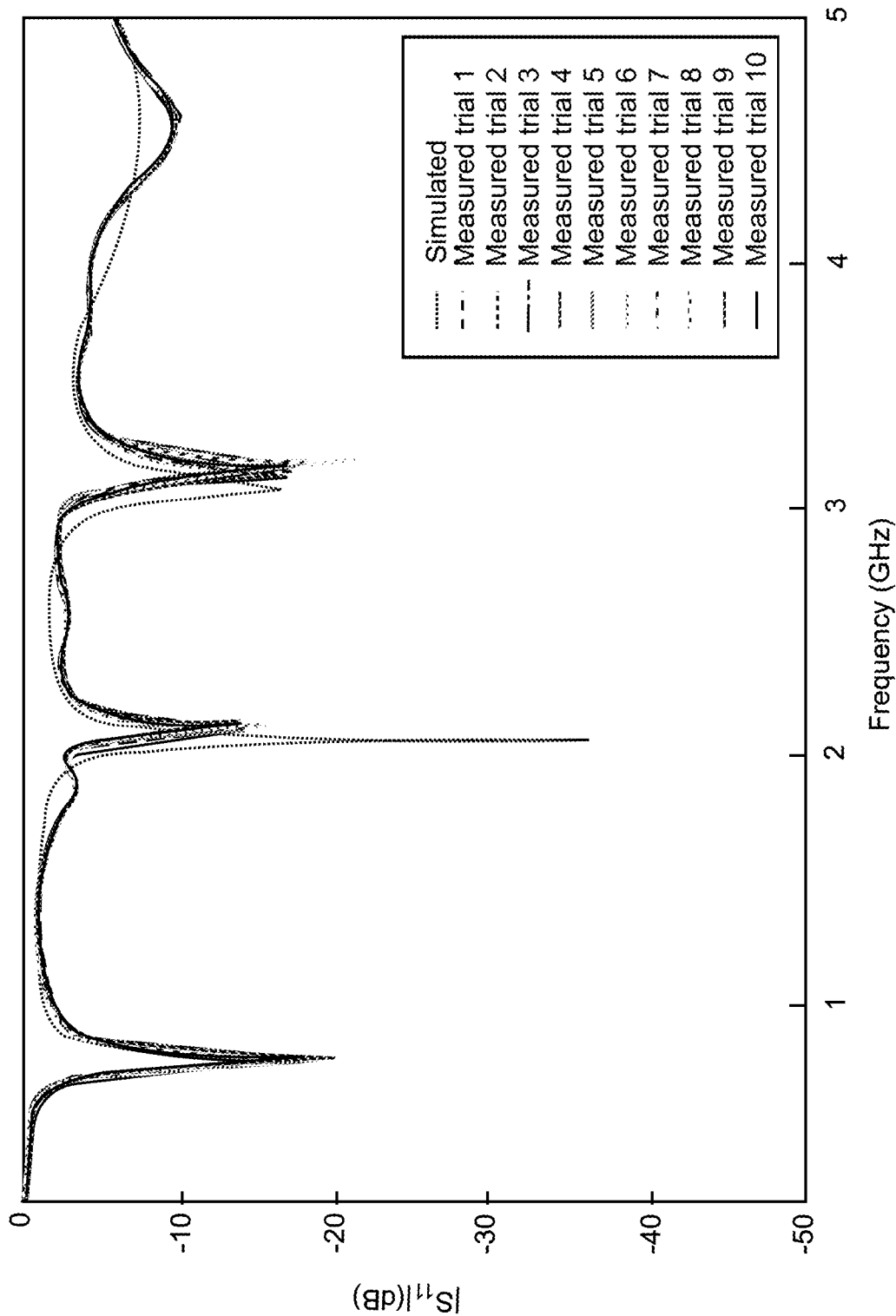
FIG. 18 illustrates measured and simulated log-magnitude of the antenna's input reflection coefficient ($S_{11}$ [dB]) for t=1.6 in., according to an embodiment of the invention.
Figure 19:
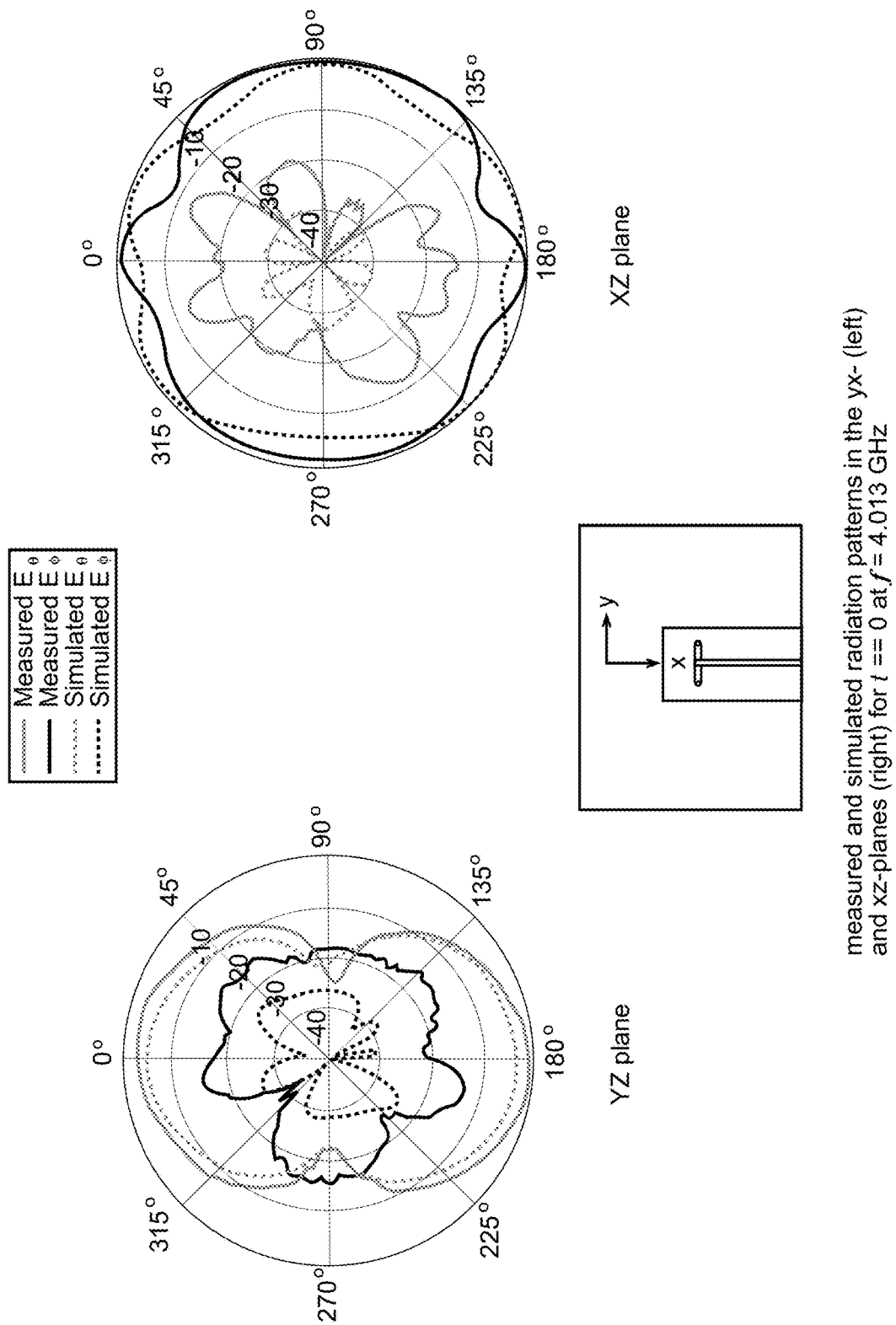
FIG. 19 illustrates measured and simulated radiation patterns in the yx-(left) and xz-planes (right) for t==0 at f=4.013 GHz, according to an embodiment of the invention.
Figure 20:
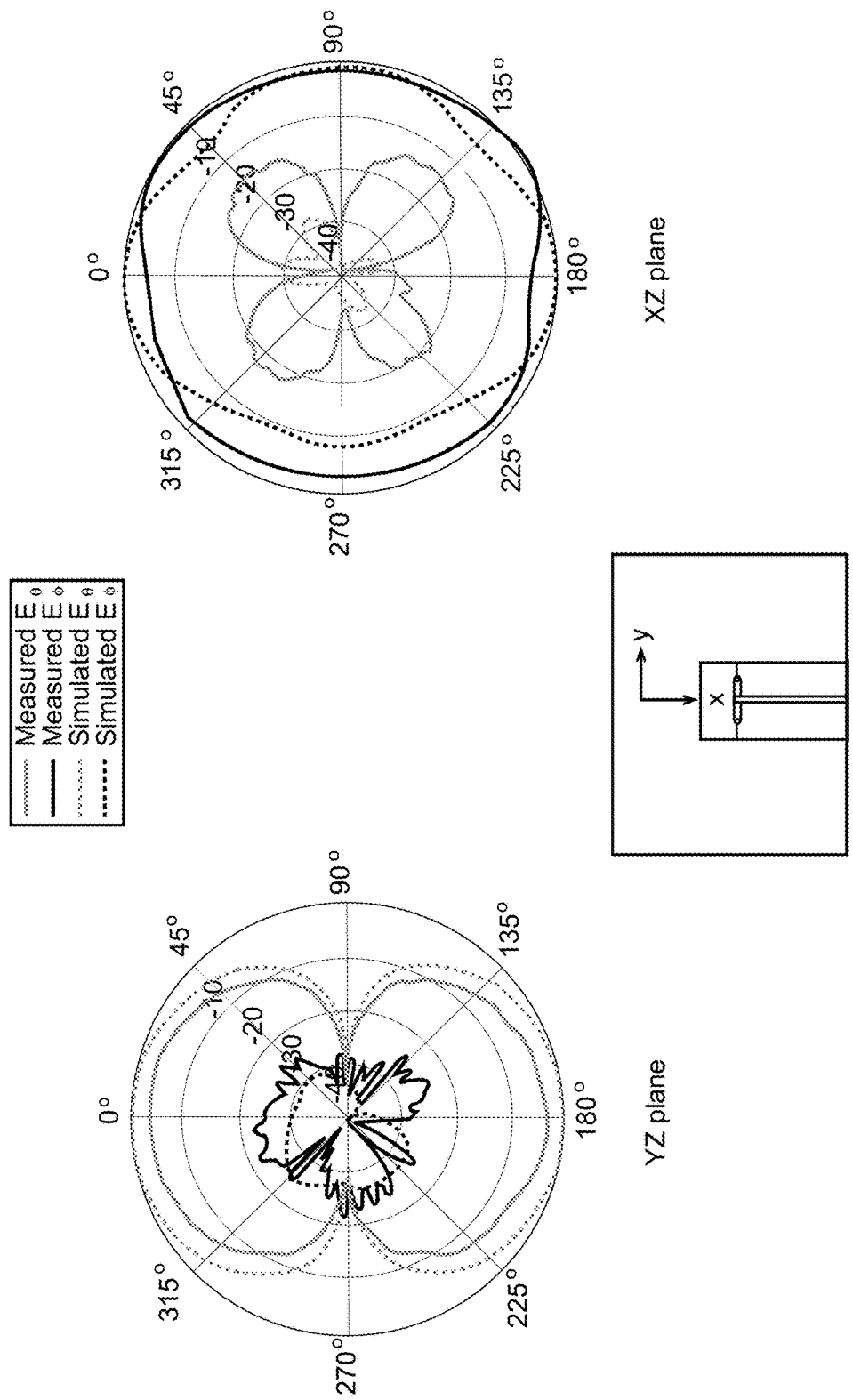
FIG. 20 illustrates measured and simulated radiation patterns in the yx-(left) and xz-planes (right) for t==0.4 at f=2.437 GHz, according to an embodiment of the invention.
Figure 21:
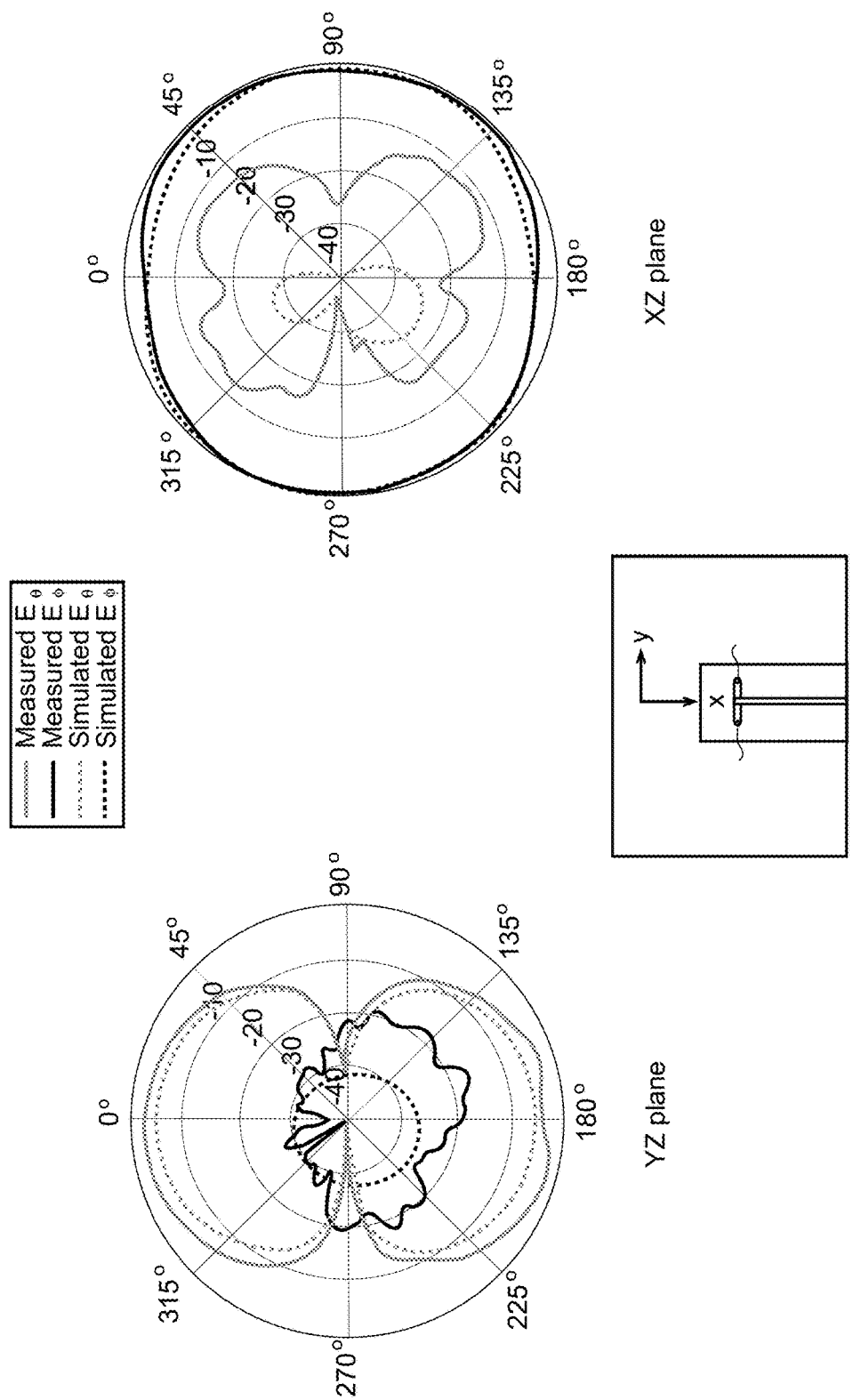
FIG. 21 illustrates measured and simulated radiation patterns in the yx-(left) and xz-planes (right) for t==0.8 at f=1.608 GHz, according to an embodiment of the invention.
Figure 22:
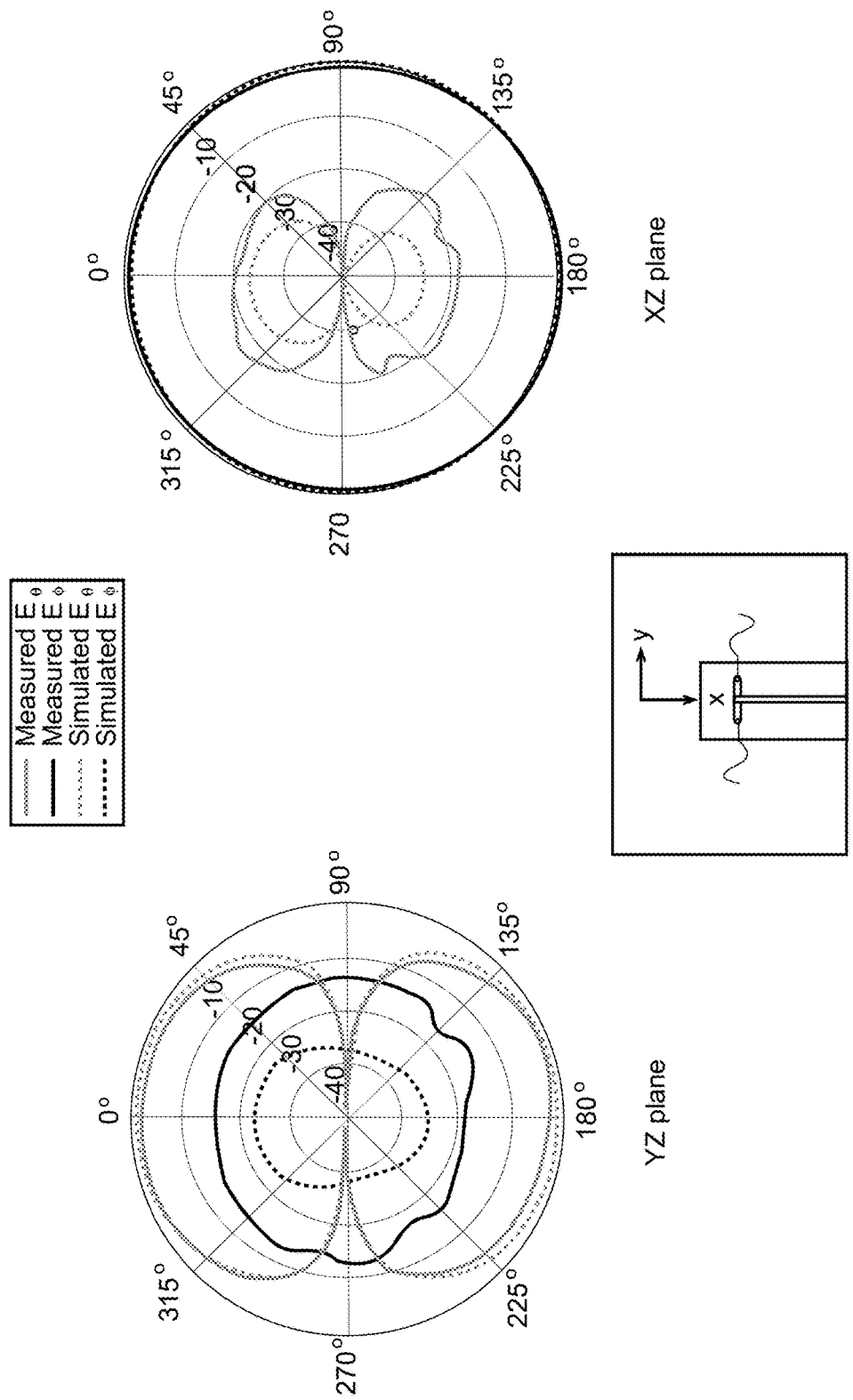
FIG. 22 illustrates measured and simulated radiation patterns in the yx-(left) and xz-planes (right) for t==1.2 at f=1.156 GHz, according to an embodiment of the invention.
Figure 23:
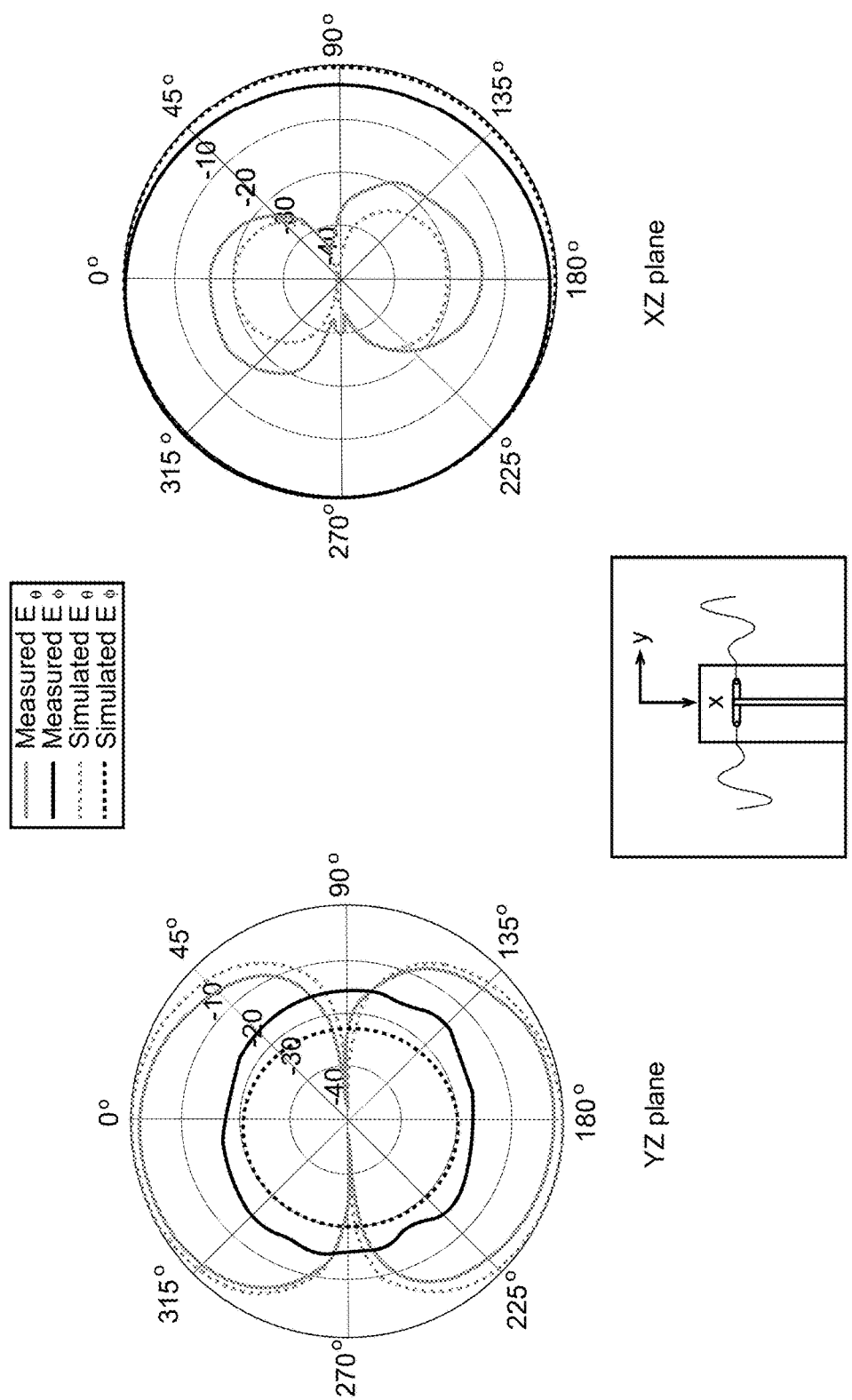
FIG. 23 illustrates measured and simulated radiation patterns in the yx-(left) and xz-planes (right) for t==1.6 at f=0.759 GHz, according to an embodiment of the invention.
Figure 24:
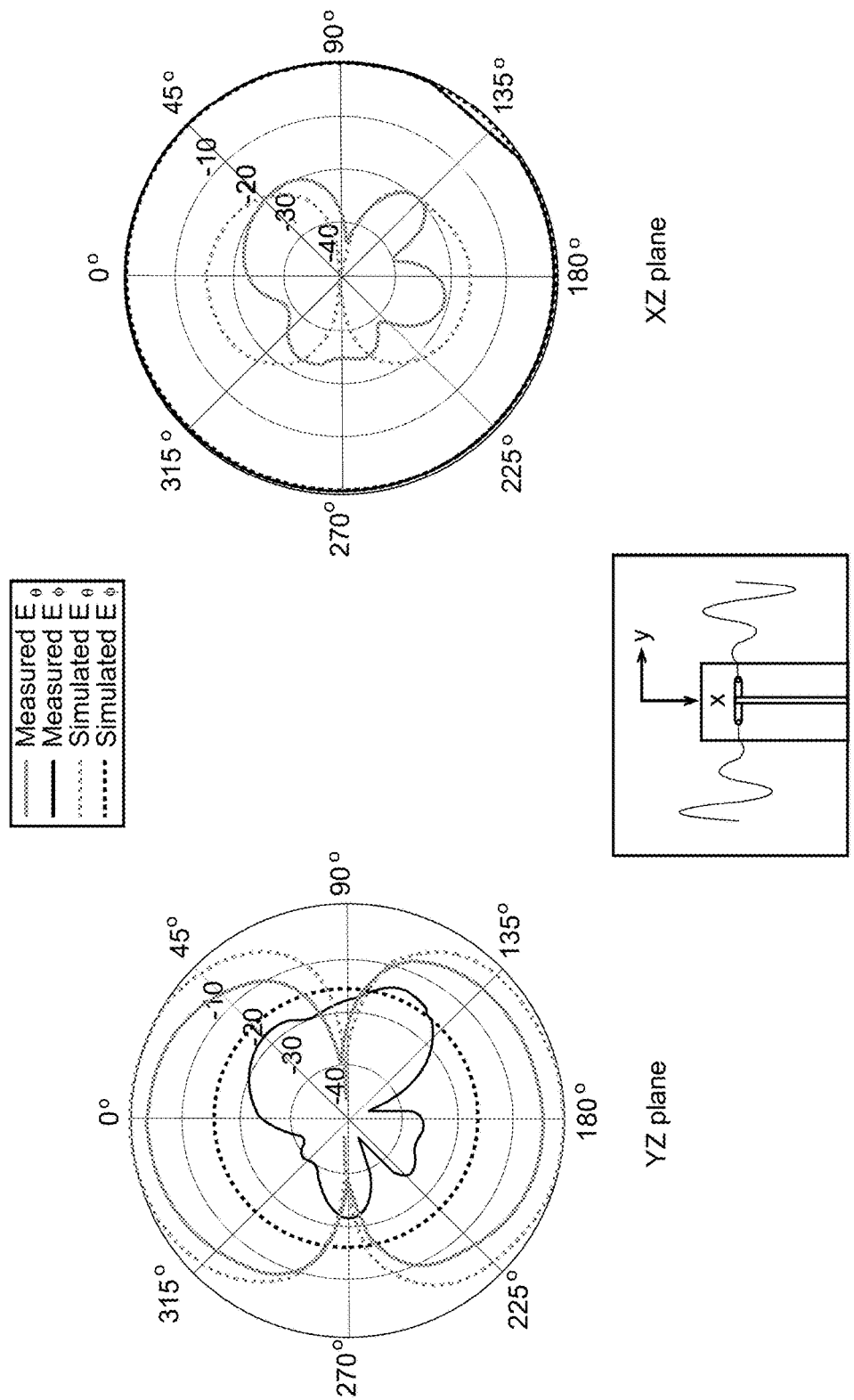
FIG. 24 illustrates measured and simulated radiation patterns in the yx-(left) and xz-planes (right) for t==2.0 at f=0.545 GHz, according to an embodiment of the invention.
Figure 25:
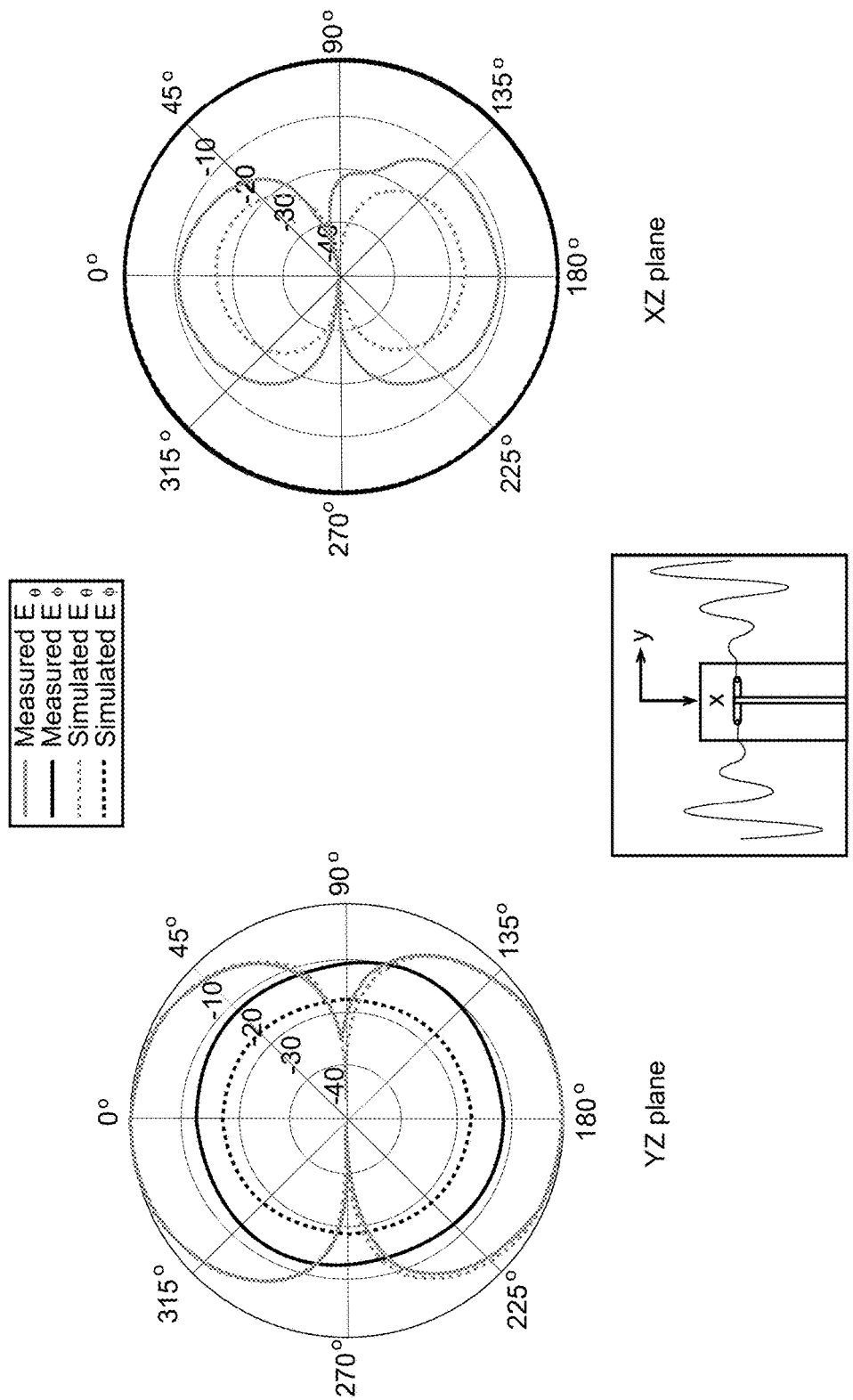
FIG. 25 illustrates measured and simulated radiation patterns in the yx-(left) and xz-planes (right) for t==2.4 at f=0.386 GHz, according to an embodiment of the invention.
Figure 26:
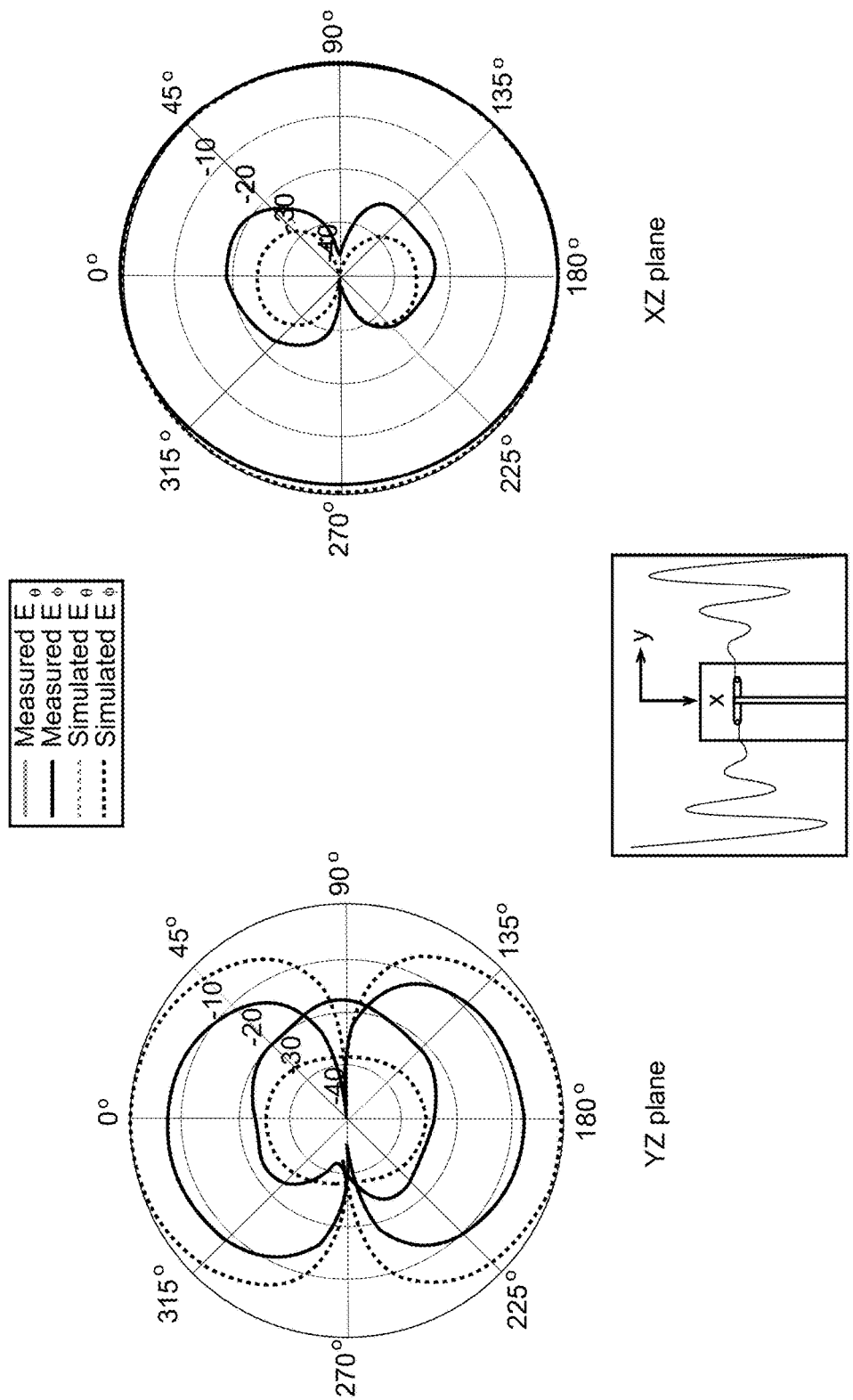
FIG. 26 illustrates measured and simulated radiation patterns in the yx-(left) and xz-planes (right) for t==2.6 at f=0.312 GHz, according to an embodiment of the invention.

Repeatability and longevity are concerns for pressure-driven liquid metal antenna systems. Factors contributing to this include oxidation of liquid metal, the effects of turbulence on the immiscible fluid barrier between liquid metal and pushing fluids, and the positioning error of the fluids throughout the SEVA-RL. Ten (10) trials were performed in which the antenna was filled to the t=1.6 mark, measured, evacuated, cleaned using a dilute HCl solution, and dried with compressed air before being filled again. FIG. 18 shows the results of these experiments. In the alternative, the surface of the channels may be treated with a phosphonic acid solution (PA) in order to promote useful wetting properties of the channel surfaces without the need to chemically strip away the oxidized LM with harsh acids.

Radiation Pattern Measurements

A test fixture was 3D printed in PLA to hold the SEVA-ES assembly upright during radiation pattern measurements. This fixture provided access to measurements of $E_\theta$ and $E_\phi$ in the xz- and yz-planes. FIGS. 19-26 illustrate radiation pattern measurements for the center of the measured 2:1 VSWR bandwidth at the first dipole mode of the antenna at the eight filling locations. The dipole in this work meanders outward along the y-axis, so these correspond to the elevation and azimuthal cut-planes, respectively, when referencing a similarly-aligned linear dipole antenna.

As disclosed above, the physical operation and computational analysis of a reconfigurable liquid metal-based bowtie antenna may be embedded into a proven aerospace structural composite, known as the SEVA-ES (structurally embedded vascular antenna-exponential sinusoid). As demonstrated above, traditional laminate composite fabrication methods may be combined with 3-D printing, and a sacrificial polymer may be used to form channels of planar form within a composite. A novel feed structure may be designed, built, and integrated that satisfies both liquid mass transfer and electromagnetic energy transfer requirements.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A reconfigurable antenna comprising:
    a panel having one or more liquid metal pumps coupled to a power supply;
    one or more liquid metal reservoirs in fluid communication with the one or more pumps;
    one or more metal traces for injecting RF energy;
    one or more channels for transporting the liquid metal, each of the one or more channels having a proximal end in fluid communication with the one or more pumps, each of the one or more channels having a vent at a distal end;
    one or more return circuits fluidically connecting the distal end of the one or more channels to one or more inlet ports situated where the one or more channels couple with the one or more metal traces, wherein application of power to the one or more pumps moves the liquid metal into or out of the channels and the return circuits thereby reconfiguring the antenna, wherein the one or more pumps are a pneumatic pump.

2. The reconfigurable antenna of claim 1, further comprising
    a layer of a phosphonic acid on the liquid metal-bearing channel surfaces.

3. The reconfigurable antenna of claim 2, where the phosphonic acid is selected from the group consisting of decylphosphonic acid (DPA), fluorobenzylphosphonic acid (FPA), and difluorobenzylphosphonic acid (DFPA).

4. The reconfigurable antenna of claim 1, further comprising one or more sensors for determining the position of the liquid metal in the channels.

5. The reconfigurable antenna of claim 4, wherein the one or more sensors include one or more flow meters and optical sensors.

6. The reconfigurable antenna of claim 1, wherein the pump is reversible to control the direction of the flow of the liquid metal.

7. The reconfigurable antenna of claim 1, wherein the panel comprises one of a conformal load-bearing panel, and an aircraft skin panel.

8. The reconfigurable antenna of claim 1, wherein the channels have internal dimensions ranging between 200-700 μm in height and 200-700 μm in width.

9. The reconfigurable antenna of claim 1, wherein the liquid metal reservoir further comprises a heat exchanger.

10. The reconfigurable antenna of claim 1, wherein the channels have a sectional shape corresponding approximately to a circle and an ellipse.

11. The reconfigurable antenna of claim 1, wherein each channel is formed in one or more layers of a panel.

* * * * *